US011395179B2

(12) United States Patent
Dhanda et al.

(10) Patent No.: US 11,395,179 B2
(45) Date of Patent: Jul. 19, 2022

(54) CHANNEL QUALITY REPORTING USING RANDOM ACCESS MESSAGES

(71) Applicant: QUALCOMM Incorporated, San Diego, CA (US)

(72) Inventors: Mungal Singh Dhanda, Slough (GB); Umesh Phuyal, San Diego, CA (US); Alberto Rico Alvarino, San Diego, CA (US); Tae Min Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 16/664,513

(22) Filed: Oct. 25, 2019

(65) Prior Publication Data

US 2020/0137624 A1 Apr. 30, 2020

Related U.S. Application Data

(60) Provisional application No. 62/753,569, filed on Oct. 31, 2018.

(51) Int. Cl.
*H04W 28/06* (2009.01)
*H04W 74/08* (2009.01)
(Continued)

(52) U.S. Cl.
CPC .......... *H04W 28/06* (2013.01); *H04W 24/10* (2013.01); *H04W 74/006* (2013.01);
(Continued)

(58) Field of Classification Search
CPC ............. H04W 28/06; H04W 74/0833; H04W 74/006; H04W 76/10; H04W 24/10;
(Continued)

(56) References Cited

U.S. PATENT DOCUMENTS

2010/0046384 A1 2/2010 Lee et al.
2020/0052767 A1 2/2020 Wang et al.

FOREIGN PATENT DOCUMENTS

EP 2709412 A1 3/2014
WO WO-2014101012 A1 7/2014

OTHER PUBLICATIONS

3GPP TSG-RAN WG1 Meeting #94 (Year: 2018).*
(Continued)

*Primary Examiner* — Thai Nguyen
(74) *Attorney, Agent, or Firm* — Holland & Hart LLP

(57) ABSTRACT

Methods, systems, and devices for wireless communications are described that support channel quality reporting using random access messages. A user equipment (UE) may receive a random access message from a base station and respond with an indication of channel quality information for a communication link between the base station and the UE. The indication may be generated by a single protocol layer of a control plane protocol stack (e.g., a radio resource control (RRC) or media access control (MAC) layer). The channel quality information may be included in the RRC message or in a header of the MAC layer from the UE. The UE may transmit, to the base station, an indication of identified channel quality information. Upon receiving the response message from the UE, the base station may determine communication parameter(s) (e.g., coding rate, modulation order, number of repetitions of a channel) for future communications with the UE.

44 Claims, 18 Drawing Sheets

(51) Int. Cl.
- *H04W 74/00* (2009.01)
- *H04W 76/10* (2018.01)
- *H04W 24/10* (2009.01)
- *H04W 80/02* (2009.01)

(52) U.S. Cl.
CPC ....... *H04W 74/0833* (2013.01); *H04W 76/10* (2018.02); *H04W 80/02* (2013.01)

(58) Field of Classification Search
CPC . H04W 80/02; H04W 72/085; H04W 74/004; H04W 4/70
See application file for complete search history.

(56) References Cited

OTHER PUBLICATIONS

Huawei., et al., "Quality Report in Msg3", 3GPP Draft, R2-1814596 Quality Report in Msg3, 3rd Generation Partnership Project (3GPP), Mobile Competence Centre, 650, Route Des Lucioles, F-06921 Sophia-Antipolis Cedex, France, vol. RAN WG2, No. Chengdu, China, Oct. 8, 2018-Oct. 12, 2018, Sep. 28, 2018 (Sep. 28, 2018), XP051524020, 5 Pages, Retrieved from the Internet, URL: http://www.3gpp.org/ftp/tsg%5Fran/WG2%5FRL2/TSGR2%5F103bis/Docs/R2%2D1814596%2Ezip. [retrieved on Sep. 28, 2018] the whole document.

International Search Report and Written Opinion—PCT/US2019/058330—ISA/EPO—dated Jan. 24, 2020 (190243WO).

Qualcomm Incorporated: "Support Of Quality Report in Msg3 For Non-Anchor", 3GPP Draft, R1-1810927 Support of Quality Report in Msg3 for Non-Anchor, 3rd Generation Partnership Project (3GPP), Mobile Competence Centre, 650, Route Des Lucioles, F-06921 Sophia-Antipolis Cedex, vol. RAN WG1, No. Chengdu, China, Oct. 8, 2018-Oct. 12, 2018, Sep. 29, 2018 (Sep. 29, 2018), XP051518332, 4 Pages, Retrieved from the Internet: URL: http://www.3gpp.org/ftp/tsg%5Fran/WG1%5FRL1/TSGR1%5F94b/Docs/R1%2D1810927%2Ezip. [retrieved on Sep. 29, 2018] section 4.

Sharetechnote: "LTE Quick Reference—MAC CE (MAC Control Element)", Oct. 1, 2018 (Oct. 1, 2018), pp. 1-1, XP055925616, Retrieved from the Internet: URL: https://web.archive.org/web/20181001180700/, https://web.archive.org/web/20181001180700/, [retrieved on May 30, 2022].

* cited by examiner

CHANNEL QUALITY REPORTING USING RANDOM ACCESS MESSAGES

CROSS REFERENCE

The present Application for Patent claims the benefit of U.S. Provisional Patent Application No. 62/753,569 by DHANDA et al., entitled "CHANNEL QUALITY REPORTING USING RANDOM ACCESS MESSAGES," filed Oct. 31, 2018, assigned to the assignee hereof, and expressly incorporated herein.

BACKGROUND

The following relates generally to wireless communications, and more specifically to channel quality reporting using random access messages.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may implement channel quality information reporting techniques to manage radio resource usage between devices. For example, a device (e.g., a UE) may establish a radio connection with another device (e.g., a base station). After establishing the connection, the UE may transmit channel quality information to the base station (e.g., in a measurement report), which may include information related to measurements and other information about the radio connection. The channel quality communications between the UE and base station may lead to high bandwidth and power consumption. These factors, among others, may lead to high resource usage and may adversely impact the ability of the UE to conserve power.

SUMMARY

The described techniques relate to improved methods, systems, devices, and apparatuses that support channel quality reporting using random access messages. Generally, the described techniques provide for a device in a wireless communications system (e.g., a user equipment (UE)) that identifies and reports channel quality information for a communication link to mitigate radio resource usage. For example, the UE may receive a message from a network device (e.g., a base station) as part of a random access procedure. The UE may identify channel quality information and transmit an indication of the channel quality information in response to the received message as part of the random access procedure. The indication of the channel quality information may be included in a portion of the message generated by a single protocol layer of a control plane protocol stack. For instance, the channel quality information may be included in one of a radio resource control (RRC) message or in a header of a media access control (MAC) protocol data unit (PDU) carrying the response message. Upon receiving the response from the UE, the base station may identify or adjust a communication parameter (e.g., coding rate, modulation order, number of repetitions of a channel) for future communications on a wireless link between the base station and UE.

A method of wireless communications at a UE is described. The method may include receiving, from a base station, a first message of a random access procedure, identifying channel quality information for a communication link between the base station and the UE, and transmitting, to the base station and in response to the first message, a second message of the random access procedure, the second message including an indication of the identified channel quality information in a portion of the second message generated by a single protocol layer of a control plane protocol stack.

An apparatus for wireless communications at a UE is described. The apparatus may include a processor, memory in electronic communication with the processor, and instructions stored in the memory. The instructions may be executable by the processor to cause the apparatus to receive, from a base station, a first message of a random access procedure, identify channel quality information for a communication link between the base station and the UE, and transmit, to the base station and in response to the first message, a second message of the random access procedure, the second message including an indication of the identified channel quality information in a portion of the second message generated by a single protocol layer of a control plane protocol stack.

Another apparatus for wireless communications at a UE is described. The apparatus may include means for receiving, from a base station, a first message of a random access procedure, identifying channel quality information for a communication link between the base station and the UE, and transmitting, to the base station and in response to the first message, a second message of the random access procedure, the second message including an indication of the identified channel quality information in a portion of the second message generated by a single protocol layer of a control plane protocol stack.

A non-transitory computer-readable medium storing code for wireless communications at a UE is described. The code may include instructions executable by a processor to receive, from a base station, a first message of a random access procedure, identify channel quality information for a communication link between the base station and the UE, and transmit, to the base station and in response to the first message, a second message of the random access procedure, the second message including an indication of the identified channel quality information in a portion of the second message generated by a single protocol layer of a control plane protocol stack.

In some examples of the method, apparatuses, and non-transitory computer-readable medium described herein, the single protocol layer includes one of an RRC layer or a MAC layer of the control plane protocol stack.

In some examples of the method, apparatuses, and non-transitory computer-readable medium described herein, the first message includes a random access response message of the random access procedure, and the second message includes an RRC connection request message of the random access procedure.

In some examples of the method, apparatuses, and non-transitory computer-readable medium described herein, transmitting the second message including the indication may include operations, features, means, or instructions for transmitting the indication of the identified channel quality information in an RRC message.

In some examples of the method, apparatuses, and non-transitory computer-readable medium described herein, transmitting the second message including the indication may include operations, features, means, or instructions for transmitting the indication of the identified channel quality information in a header of a MAC PDU carrying the second message.

In some examples of the method, apparatuses, and non-transitory computer-readable medium described herein, the header of the MAC PDU includes a 2-bit channel quality field, and the indication of the identified channel quality information may be included in the 2-bit channel quality field.

In some examples of the method, apparatuses, and non-transitory computer-readable medium described herein, the header of the MAC PDU includes a 1-bit channel quality field, and the indication of the identified channel quality information may be included in the 1-bit channel quality field.

In some examples of the method, apparatuses, and non-transitory computer-readable medium described herein, the header of the MAC PDU includes a logical channel identifier (LCID) that indicates that the header carries channel quality information.

Some examples of the method, apparatuses, and non-transitory computer-readable medium described herein may further include operations, features, means, or instructions for receiving signaling that indicates support, by the base station, of the header carrying channel quality information.

Some examples of the method, apparatuses, and non-transitory computer-readable medium described herein may further include operations, features, means, or instructions for identifying a communication parameter for the communication link based on the identified channel quality information, where the indication of the identified channel quality information includes an indication of the identified communication parameter.

In some examples of the method, apparatuses, and non-transitory computer-readable medium described herein, the identified communication parameter includes a transmission power, a modulation order, a coding rate, a modulation and coding scheme (MCS), a number of repetitions for a control channel or a shared channel, or a combination thereof.

Some examples of the method, apparatuses, and non-transitory computer-readable medium described herein may further include operations, features, means, or instructions for determining a number of repetitions for downlink transmissions, the number of repetitions being different than a previous number of repetitions for downlink transmissions, and transmitting the second message including the identified channel quality information based on the number of repetitions being different than the previous number of repetitions.

A method of wireless communications at a base station is described. The method may include transmitting, to a UE, a first message of a random access procedure and receiving, from the UE and in response to the first message, a second message of the random access procedure, the second message including an indication of channel quality information for a communication link between the base station and the UE, the indication in a portion of the second message associated with a single protocol layer of a control plane protocol stack.

An apparatus for wireless communications at a base station is described. The apparatus may include a processor, memory in electronic communication with the processor, and instructions stored in the memory. The instructions may be executable by the processor to cause the apparatus to transmit, to a UE, a first message of a random access procedure and receive, from the UE and in response to the first message, a second message of the random access procedure, the second message including an indication of channel quality information for a communication link between the base station and the UE, the indication in a portion of the second message associated with a single protocol layer of a control plane protocol stack.

Another apparatus for wireless communications at a base station is described. The apparatus may include means for transmitting, to a UE, a first message of a random access procedure and receiving, from the UE and in response to the first message, a second message of the random access procedure, the second message including an indication of channel quality information for a communication link between the base station and the UE, the indication in a portion of the second message associated with a single protocol layer of a control plane protocol stack.

A non-transitory computer-readable medium storing code for wireless communications at a base station is described. The code may include instructions executable by a processor to transmit, to a UE, a first message of a random access procedure and receive, from the UE and in response to the first message, a second message of the random access procedure, the second message including an indication of channel quality information for a communication link between the base station and the UE, the indication in a portion of the second message associated with a single protocol layer of a control plane protocol stack.

In some examples of the method, apparatuses, and non-transitory computer-readable medium described herein, the single protocol layer includes one of an RRC layer or a MAC layer of the control plane protocol stack.

In some examples of the method, apparatuses, and non-transitory computer-readable medium described herein, the first message includes a random access response message of the random access procedure, and the second message includes an RRC connection request message of the random access procedure.

In some examples of the method, apparatuses, and non-transitory computer-readable medium described herein, receiving the second message including the indication may include operations, features, means, or instructions for receiving the indication of the identified channel quality information in an RRC message.

In some examples of the method, apparatuses, and non-transitory computer-readable medium described herein, the header of the MAC PDU includes a 2-bit channel quality field, and the indication of the channel quality information may be included in the 2-bit channel quality field.

In some examples of the method, apparatuses, and non-transitory computer-readable medium described herein, the header of the MAC PDU includes a 1-bit channel quality field, and the indication of the identified channel quality information may be included in the 1-bit channel quality field.

In some examples of the method, apparatuses, and non-transitory computer-readable medium described herein, the header of the MAC PDU includes an LCID that indicates that the header carries channel quality information.

Some examples of the method, apparatuses, and non-transitory computer-readable medium described herein may further include operations, features, means, or instructions for transmitting signaling that indicates support, by the base station, of the header carrying channel quality information.

In some examples of the method, apparatuses, and non-transitory computer-readable medium described herein, receiving the second message including the indication may include operations, features, means, or instructions for receiving the indication of the identified channel quality information in a header of a MAC PDU carrying the second message.

Some examples of the method, apparatuses, and non-transitory computer-readable medium described herein may further include operations, features, means, or instructions for identifying a communication parameter for the communication link based on the channel quality information, where the indication of the channel quality information includes an indication of the identified communication parameter.

In some examples of the method, apparatuses, and non-transitory computer-readable medium described herein, the identified communication parameter includes a transmission power, a modulation order, a coding rate, an MCS, a number of repetitions for a control channel or a shared channel, or a combination thereof.

Some examples of the method, apparatuses, and non-transitory computer-readable medium described herein may further include operations, features, means, or instructions for determining a number of repetitions for downlink transmissions, the number of repetitions being different than a previous number of repetitions for downlink transmissions, and receiving the second message including the channel quality information based on the number of repetitions being different than the previous number of repetitions.

DETAILED DESCRIPTION

Figure 1:
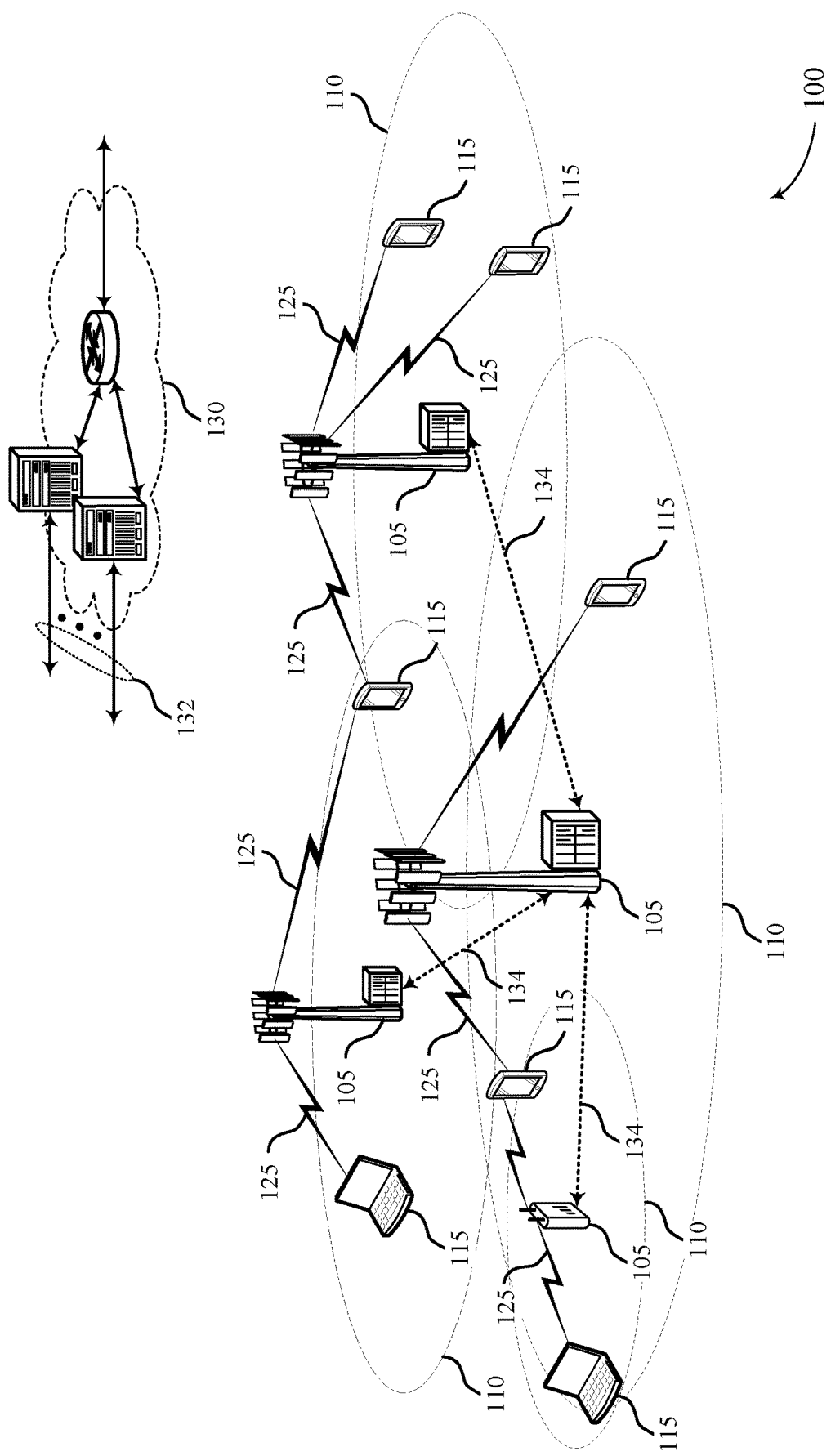
FIG. 1 illustrates an example of a wireless communications system that supports channel quality reporting using random access messages in accordance with aspects of the present disclosure.

Some wireless communications systems may utilize channel quality information reporting techniques to manage radio resources for communications between at least one network device (e.g., a base station) and at least one user equipment (UE). For example, a UE may establish a radio connection with a base station through a synchronization or acquisition procedure (e.g., a random access channel (RACH) procedure). After establishing a connection, the UE may transmit channel quality information to the base station in a measurement report. The measurement report may include information related to downlink channel quality, uplink channel quality, or other channel characteristics. The base station may use the channel quality information to schedule subsequent communications with the UE or adjust communication parameters.

A UE may be a low power device (e.g., a narrowband internet of things (NB-IoT) or a machine type communication (MTC) device), and transmission power, awake time, retransmissions, and other factors may limit or impact the UE's ability to conserve power. Further, procedures used to establish a radio connection and report channel quality to a base station may result in an increase in resources (e.g., time, frequency, power) used by the UE. In some cases, a device (e.g., a UE or base station) may attempt to limit the number and length of packets transmitted between the UE and the base station in order to reduce bandwidth usage and power consumption.

According to techniques described herein, channel quality reporting may be performed by a UE during initial acquisition or other connection establishment procedures (e.g., a random access or RACH procedure). For instance, a UE in communication with a base station may perform a RACH procedure to establish or reestablish a connection with the base station. During the RACH procedure, the UE may transmit a random access preamble (e.g., Msg1) and receive a random access response message (e.g., Msg2) from the base station in response. The random access response message may indicate resources for a subsequent message (e.g., Msg3) to be transmitted by the UE.

In some cases, the UE may identify and report channel quality information for a communication link (e.g., uplink or downlink communication link) with the base station, and may include an indication of the channel quality information in a random access message (e.g., Msg3) to the base station.

As part of the RACH procedure, the indication of the channel quality information may be included in a portion of the message generated by a single protocol layer of a control plane protocol stack (e.g., one of a radio resource control (RRC), or a media access control (MAC) layer) of the UE. For instance, the channel quality information may be included as a part of the RRC message (e.g., in a previously unused, spare, or reserved bit), or in a header of a MAC protocol data unit (PDU) carrying Msg3 (e.g., in a previously unused, spare, or reserved bit). In some cases, the channel quality information may be indicated using a single bit (e.g., of an RRC message or in a header of a MAC PDU). In other examples, multiple bits may be used (e.g., in a dedicated field of a MAC PDU header).

The channel quality information may be used by the UE to request that the base station increase a number of repetitions of a control channel (e.g., a physical downlink control channel (PDCCH) or an MTC PDCCH (mPDCCH)) or a shared channel (e.g., a physical downlink shared channel (PDSCH)). Upon receiving the response from the UE, the base station may identify or adjust a communication parameter (e.g., coding rate, modulation order, number of repetitions of a channel) for subsequent uplink or downlink transmissions.

Particular aspects of the subject matter described herein may be implemented to realize one or more advantages. The described techniques may support improvements in the channel quality information reporting framework by limiting the number and length of packets transmitted between a UE and base station for reporting channel quality information. The described techniques may reduce resource usage and power consumption, among other advantages. As such, supported techniques may include improved network operations and, in some examples, may promote network efficiencies, among other benefits.

Aspects of the disclosure are initially described in the context of a wireless communications system. Aspects are then described with respect to MAC PDU headers and a process flow. Aspects of the disclosure are further illustrated by and described with reference to apparatus diagrams, system diagrams, and flowcharts that relate to channel quality reporting using random access messages.

FIG. 1 illustrates an example of a wireless communications system 100 that supports channel quality reporting using random access messages in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\,T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may identify and report channel quality information (e.g., downlink channel quality, uplink channel quality) for a communication link 125 with a base station 105. The UE 115 may transmit an indication of the channel quality information to a base station 105 during a random access procedure (e.g., a RACH procedure). For instance, UE 115 may transmit an indication of the channel quality information in Msg3 of a RACH procedure. In some cases, the UE 115 may utilize a single bit for indicating the channel quality information, which may be included within a spare bit of an RRC message and generated by an RRC layer of a control plane stack of the UE 115. Additionally or alternatively, UE 115 may indicate the channel quality information using one or more bits of a MAC PDU header that carries Msg3. After receipt of the Msg3 that indicates channel quality information, a base station 105 may allocate resources or adjust a communication parameter (e.g., coding rate, modulation order, number of repetitions of a channel) for subsequent communications with the UE 115.

Figure 2:
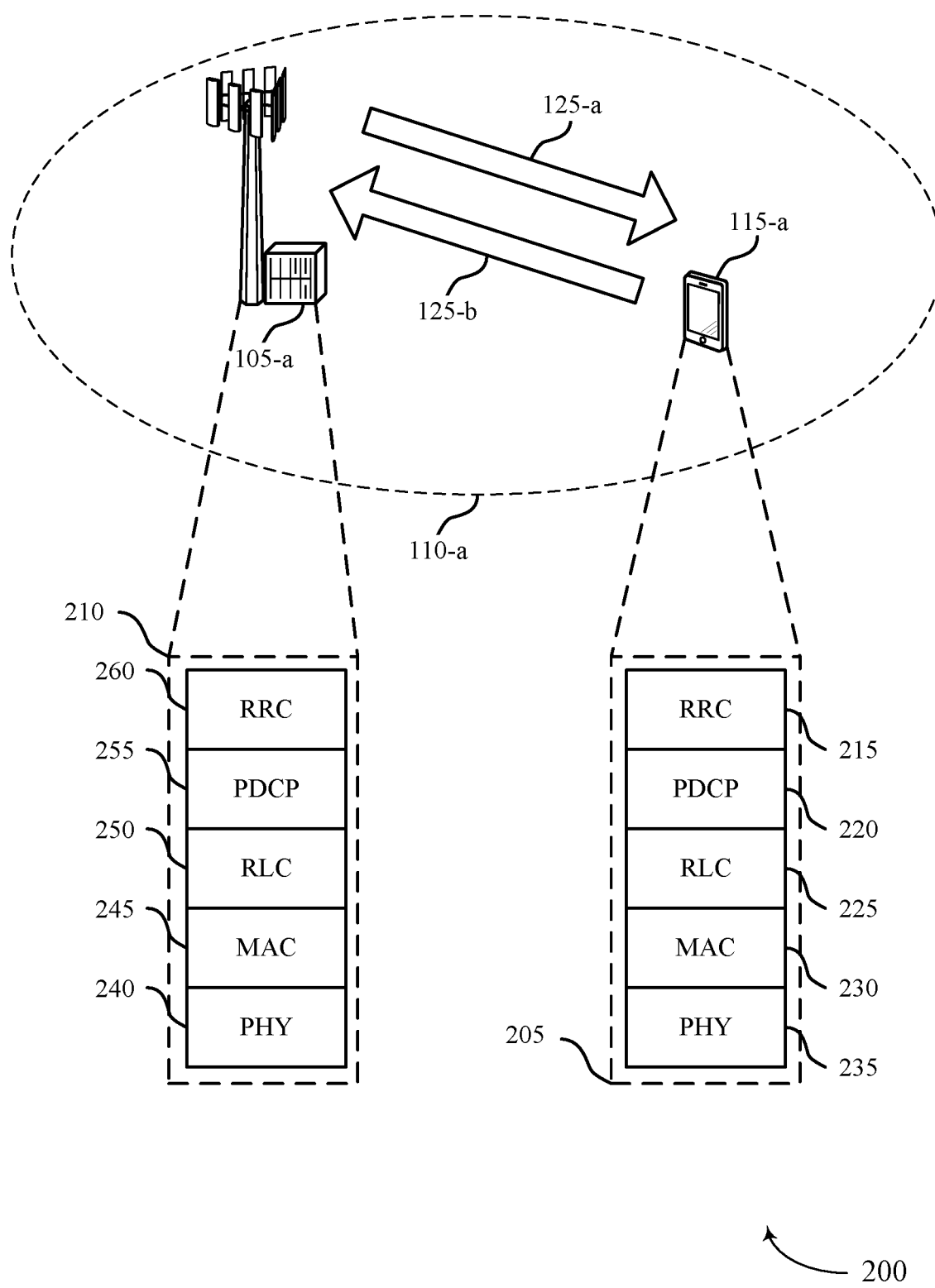
FIG. 2 illustrates an example of a wireless communications system that supports channel quality reporting using random access messages in accordance with aspects of the present disclosure.

FIG. 2 illustrates an example of a wireless communications system 200 that supports channel quality reporting using random access messages in accordance with aspects of the present disclosure. In some examples, wireless communications system 200 may implement aspects of wireless communications system 100. Wireless communications system 200 includes UE 115-a and base station 105-a, which may be respective examples of a UE 115 and a base station 105 as described herein. In some examples, UE 115-a may be an NB-IoT, an eMTC device, or other low power device.

UE 115-a and base station 105-a may exchange messages (e.g., control messages, data messages) over communication links 125-a and 125-b as part of a random access procedure. In some aspects, UE 115-a or base station 105-a may generate a packet for transmission by passing information bits through a protocol stack (e.g., control plane protocol stack 205 associated with UE 115-a and control plane protocol stack 210 associated base station 105-a) and generating PDUs at each layer within the protocol stack 205 or 210. For example, UE 115-a may generate an uplink message beginning at the RRC layer 215, process the message via the PDCP layer 220, RLC layer 225, and MAC layer 230, and transmit the message to base station 105-a over the PHY layer 235. Base station 105-a may receive the message via PHY layer 240 and process the transmission using various protocol layers in reverse, passing through MAC layer 245, RLC layer 250, PDCP layer 255, and RRC layer 260 to decode the message and obtain the information bits. For downlink messages, for example if the base station 105-a wishes to respond to the message received from UE 115-a, the base station 105-a may generate a packet by passing a set of information bits through the RRC layer 260, PDCP layer 255, RLC layer 250, MAC layer 245, and may transmit the downlink message to the UE 115-a via PHY layer 240. Other layers or arrangements of layers in protocol stacks 205 and 210 may implement techniques described herein without departing from the scope of the present disclosure.

UE 115-a may transmit downlink channel quality information to base station 105-a over communication link 125-b. In some examples, the downlink channel quality information may be or include a channel quality indicator (CQI), or another channel quality metric such as rank indication (RI), a precoding matrix indicator (PMI), etc. The downlink channel quality information may contain channel quality information for one or more channels transmitted via communication link 125-a or 125-b.

UE 115-a may determine to transmit the downlink quality information in response to UE 115-a receiving a message from base station 105-a over communication link 125-b. In some cases, the message received from base station 105-a may be part of a random access procedure (e.g., a RACH procedure). For example, the message from base station 105-a may be a random access response message (e.g., Msg2) of the random access procedure or the message may be part of or include a system information block (SIB).

In some examples, UE 115-a may transmit the downlink channel quality information in a message of a RACH procedure. For example, UE 115-a may transmit an indication of the downlink channel quality information in Msg3 of the RACH procedure. Because Msg3 may be the first UE-specific message of the RACH procedure, Msg3 may be used to uniquely identify the UE from which base station 105-a receives the downlink channel quality information.

The UE 115-*a* may receive signaling from base station 105-*a* that indicates support, by base station 105-*a*, of channel quality reporting via a message of the RACH procedure. The UE 115-*a* may receive this signaling from the base station 105-*a* prior to performing the RACH procedure, or the base station 105-*a* may be preconfigured to support channel quality reporting (e.g., providing an indication of CQI via one or more random access messages. In some cases, base station 105-*a* may transmit signaling in a SIB that indicates the base station 105-*a* supports receiving downlink channel quality information in the message of the RACH procedure.

According to some aspects, the downlink channel quality information may be in a portion of a random access message from the UE 115-*a* to the base station 105-*a* that was generated by a single protocol layer of protocol stack 205 (one of RRC layer 215, PDCP layer 220, RLC layer 225, MAC layer 230, or PHY layer 235). In some examples, the downlink channel quality information may include a single bit and may be contained in a random access message (e.g., Msg3) of a RACH procedure. The random access message, Msg3, may be an RRC connection request (e.g., RRCConnectionRequest), RRC connection resume request (e.g., RRCConnectionResumeRequest), RRC connection reestablishment request (e.g., RRCConnectionReestablishmentRequest), or RRC connection reconfiguration message (e.g., RRCConnectionReconfiguration). For instance, UE 115-*a* may use a bit of the random access message Msg3 (e.g., a spare bit in the Msg3) to indicate the downlink channel quality information. In some cases, in generating the random access message, Msg3, for transmission to base station 105-*a*, UE 115-*a* may include the downlink channel quality in a bit of the PDU generated by RRC layer 215.

Additionally or alternatively, UE 115-*a* may transmit a single bit containing the downlink channel quality information in a header of a MAC PDU that carries a message of a RACH procedure (e.g., Msg3). For example, UE 115-*a* may determine downlink channel quality information and include an indication of the downlink channel quality in a header of a MAC PDU generated by the MAC layer 230.

The single bit containing the downlink channel quality information may have a value of 0 or 1. A value of 0 may indicate to base station 105-*a* that UE 115-*a* does not support downlink channel quality information reporting in the message of the RACH procedure or may indicate a request for a change in one or more communication parameters (e.g., a modulation order, a coding rate, a modulation and coding scheme (MCS) index, a transmission power). Additionally or alternatively, a value of 0 may indicate to base station 105-*a* that UE 115-*a* is not reporting downlink channel quality information in the message from UE 115-*a*. A value of 1 may indicate to base station 105-*a* that UE 115-*a* requests additional channel repetitions than base station 105-*a* may be currently using for transmission of one or more channels. For example, UE 115-*a* may request additional repetitions for an MPDCCH or a PDSCH. The number of repetitions that UE 115-*a* may request may be related to the current number of repetitions. For instance, the single bit may indicate an increase or a decrease of repetitions by a preconfigured factor (e.g., 1, 2, 4, 8, 16, 32, 64, 128, or 256).

In some cases, UE 115-*a* may transmit the downlink channel quality information in a channel quality field of a header of the MAC PDU that carries the message of the RACH procedure (e.g., Msg3). In some examples, the channel quality field may span multiple bits (e.g., 2, 3, 4) in the header of the MAC PDU. For instance, a 2-bit channel quality field may be able to carry a more granular downlink channel quality information through the use of multiple bits. In some aspects, the channel quality field may be a combination of a reserved (R) field and a format 2 (F2) field in the MAC PDU header and may be in the first octet of the MAC PDU header, or a combination thereof. In some cases, the channel quality field may indicate an estimate of the downlink channel quality between UE 115-*a* and the base station 105-*a*.

In a MAC PDU header that does not contain a channel quality field, the F2 field may indicate to base station 105-*a* whether a length (L) field in the MAC PDU header is less than or equal to a threshold number of bits (e.g., less than 16 bits or equal to 16 bits). For example, a size of the Msg3 may be such that the L field may be less than 16 bits. In such cases, the UE 115-*a* may set the F2 field to 0 and combine the F2 field with the R field to transmit the downlink channel quality information using multiple (e.g., 2) bits.

In some examples, the MAC PDU header may contain a logical channel identifier (LCD), which may have a value which indicates to base station 105-*a* that the MAC PDU header contains the channel quality field. The LCD value may be a reserve value (e.g., 01110). UE 115-*a* may use the MAC PDU header containing the channel quality field if UE 115-*a* receives signaling from base station 105-*a* indicating that base station 105-*a* supports use of the MAC PDU header containing the channel quality field. Additionally or alternatively, UE 115-*a* may use the MAC PDU header containing the channel quality field if UE 115-*a* supports downlink channel quality information reporting in a message of the RACH procedure (e.g., Msg3). In some examples, UE 115-*a* may use the MAC PDU header containing the channel quality field if UE 115-*a* determines additional repetitions of MPDCCH or PDSCH before transmission of Msg3.

After receiving the indication of the channel quality, base station 105-*a* may adjust a communication parameter of a subsequent downlink transmission over communication link 125-*a*. For example, based on the channel quality information, base station 105-*a* may increase the number of repetitions of the MPDCCH or PDSCH that base station 105-*a* transmits to UE 115-*a*. The number of repetitions in the subsequent downlink transmission may be related to the number of repetitions in a previous downlink transmission by a multiplication factor (e.g., 1, 2, 4, 8, 16, 32, 64, 128, or 256). Additionally or alternatively, base station 105-*a* may adjust an MCS (e.g., a modulation order or a coding rate) for the subsequent downlink transmission such as an MCS that increases throughput compared to an MCS used in a previous downlink transmission or a coding rate that increases redundancy. Additionally or alternatively, base station 105-*a* may increase a transmission power for a subsequent downlink transmission.

Figure 3A:
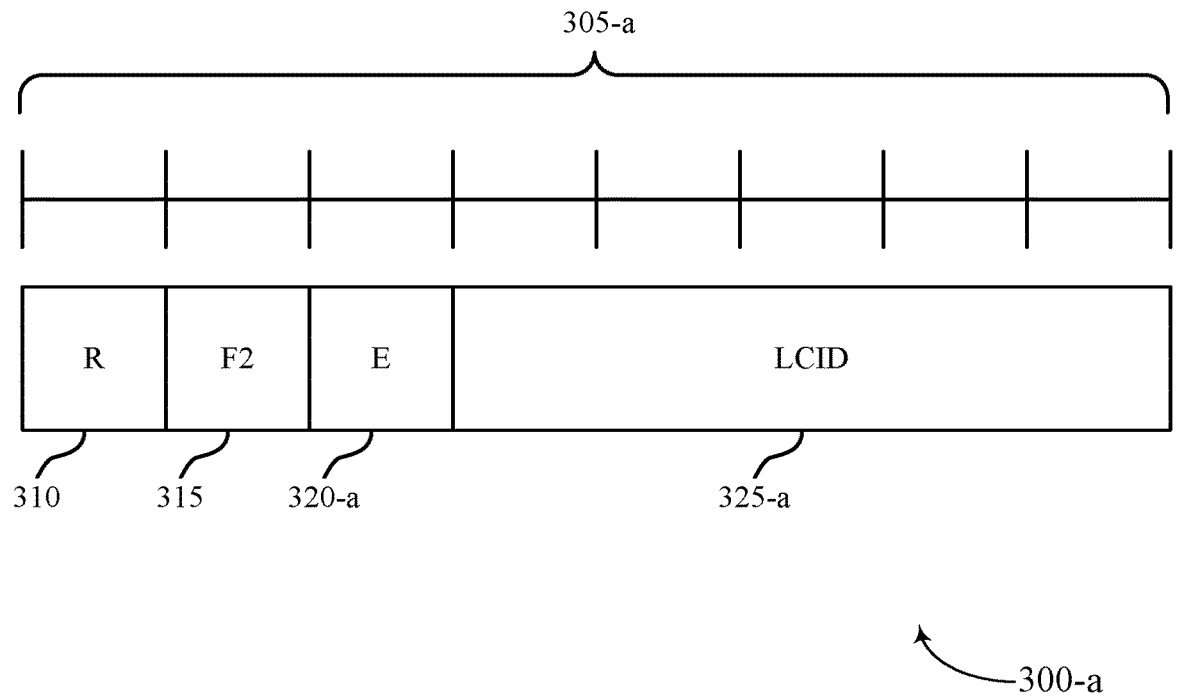
FIGS. 3A and 3B illustrate example media access control (MAC) protocol data unit (PDU) headers that supports channel quality reporting using random access messages in accordance with aspects of the present disclosure.

FIG. 3A illustrates an example of a MAC PDU header 300-*a* that supports channel quality reporting using random access messages in accordance with aspects of the present disclosure. In some examples, MAC PDU header 300-*a* may implement aspects of wireless communications systems 100 or 200.

In FIG. 3A, octet 305-*a* is for a MAC PDU header 300-*a*, which may be transmitted as part of a RACH procedure (e.g., in a Msg3 from a UE to a base station), as described herein. In some cases, octet 305-*a* may be a first octet in the MAC PDU header 300-*a*. As shown, octet 305-*a* includes 8 bits and may include a reserved (R) field 310, format 2 (F2) field 315, extension (E) field 320-*a*, and LCID field 325-*a*. In some cases, each of R field 310, F2 field 315, and E field 320-*a* may include a single bit.

Each bit of R field 310, F2 field 315, and E field 320-*a* may have a value of 0 or 1. R field 310 may be reserved, and in some examples may be set to 0. F2 field 315 may indicate to base station whether an L field in the MAC PDU header is 16 bits, in which case UE may set the value of F2 field 315 to 1, or less than 16 bits, in which case UE may set the value of F2 field 315 to 0. In some examples, the size of the MSG3 may be such that the length field may be less than 16 bits, and UE may set the value of F2 field 315 to 0. E field 320-*a* may indicate if another MAC PDU header or than MAC PDU header 300-*a* is present. If another MAC PDU header is present, UE 115 may set the value of E field 320-*a* to 1. If another MAC PDU header is not present, UE 115 may set the value of E field 320-*a* to 0.

LCID field 325-*a* may contain a logic channel number. The logical channel number may indicate characteristics of data contained in the MAC PDU. The logic channel number may indicate the data contained in the MAC PDU includes one or more of control channels, signaling messages, etc.

In some examples, a UE may transmit downlink channel quality information in R field 310. The downlink channel quality information may include a single bit. In some cases, the UE may transmit the single bit containing the downlink channel quality information in R field 310 based on UE determining that the MAC protocol layer has a spare bit to carry the downlink channel quality information.

The single bit containing the downlink channel quality information may have a value of 0 or 1. A value of 0 may indicate to base station that UE may not support downlink channel quality information reporting in the message of the RACH procedure. Additionally or alternatively, a value of 0 may indicate to base station that UE may not report downlink channel quality information in the message from UE. A value of 1 may indicate to base station that UE requests more channel repetitions than base station may be currently using. For example, UE may request additional MPDCCH or PDSCH repetitions. The number of repetitions that UE may request may be related to the current number of repetitions by a factor (e.g., 1, 2, 4, 8, 16, 32, 64, 128, or 256).

Figure 3B:
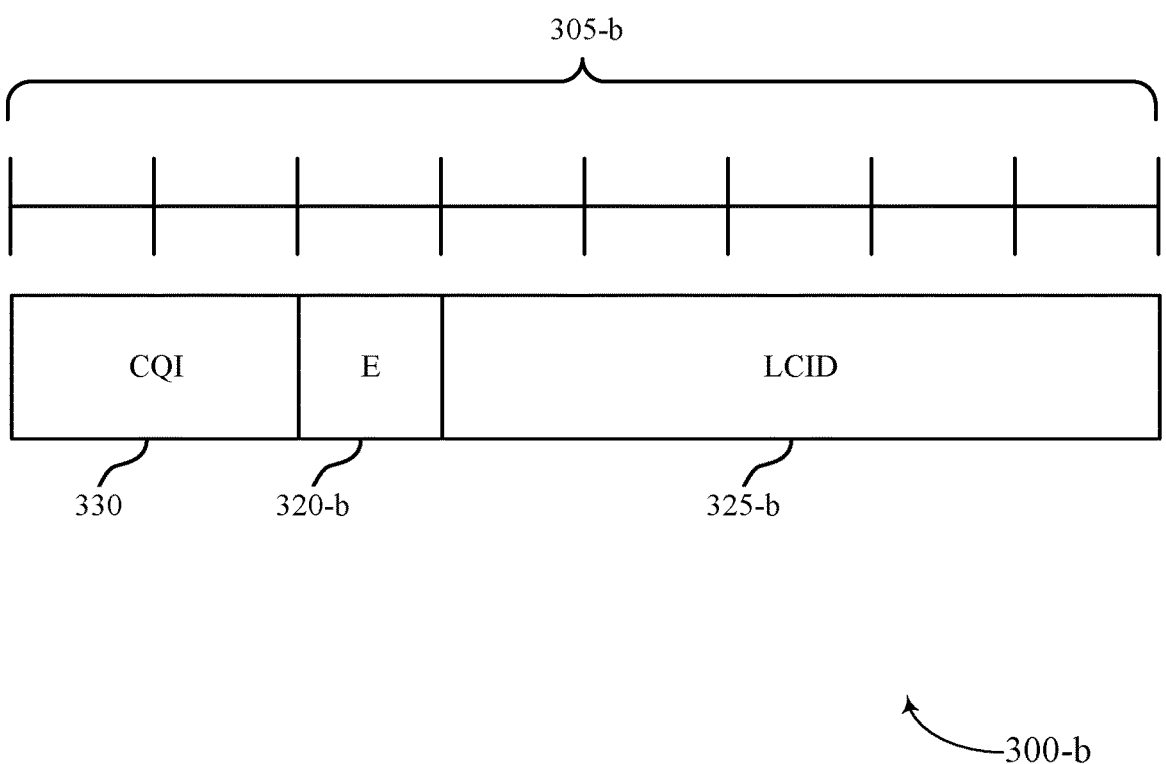

FIG. 3B illustrates an example of a MAC PDU header 300-*b* that supports channel quality reporting using random access messages in accordance with aspects of the present disclosure. In some examples, MAC PDU header 300-*b* may implement aspects of wireless communications systems 100 or 200.

In FIG. 3B, octet 305-*b* is for a MAC PDU header 300-*b*, which may be transmitted as part of a RACH procedure (e.g., in a Msg3 from a UE to a base station), as described herein. In some cases, octet 305-*b* may be a first octet in the MAC PDU header 300-*b*. As shown, octet 305-*b* includes 8 bits and may include a CQI field 330, E field 320-*b*, and LCID field 325-*b*.

In some cases, UE 115 may transmit the downlink channel quality information in CQI field 330. In some examples, CQI field 330 may include 2 bits and may allow for more granular downlink channel quality information through the use of multiple bits. CQI field 330 may be a combination of an R field and an F2 field in the MAC PDU header. UE 115 may combine the F2 field with the R field to transmit the downlink channel quality information in a 2-bit field.

E field 320-*b* may indicate if another MAC PDU header is present. If another MAC PDU header is present, UE 115 may set the value of E field 320-*b* to 1. If another MAC PDU header is not present, UE 115 may set the value of E field 320-*b* to 0.

LCID field 325-*b* may contain a logic channel number. The logic channel number may indicate to base station 105 that the MAC PDU header contains CQI field 330. The logic channel number may be a reserve value (e.g., 01110). UE 115 may use the MAC PDU header containing the CQI field 330 if UE 115 receives signaling from the base station indicating that the base station supports use of the MAC PDU header containing CQI field 330. UE 115 may use the MAC PDU header containing CQI field 330 if UE 115 supports downlink channel quality information reporting in the message of the RACH procedure. UE 115 may use the MAC PDU header containing CQI field 330 if UE 115 determines before transmitting the message of the RACH procedure that UE 115 may need to request more repetitions of the MPDCCH or PDSCH than the base station may be currently using.

Figure 4:
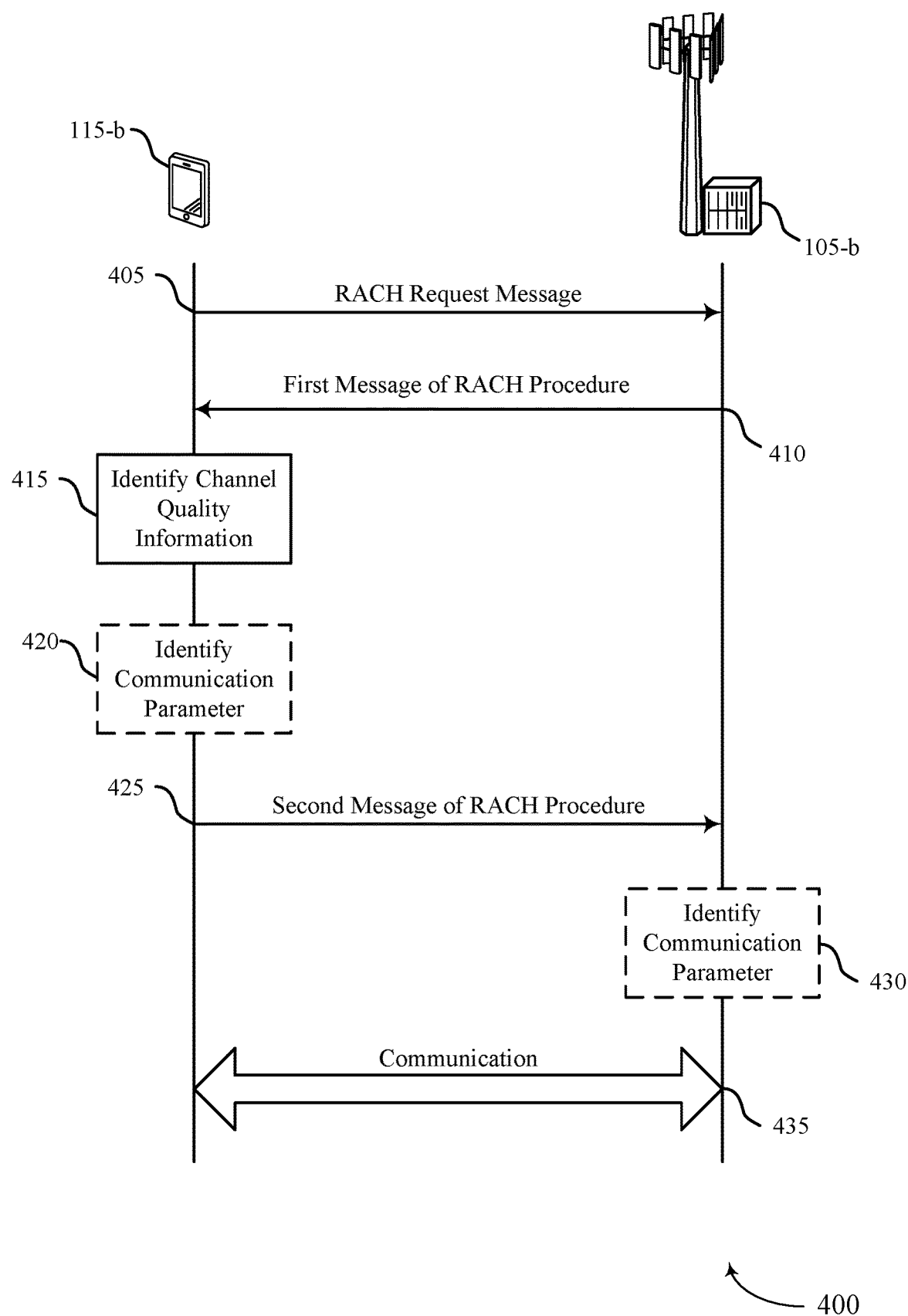
FIG. 4 illustrates an example of a process flow that supports channel quality reporting using random access messages in accordance with aspects of the present disclosure.

FIG. 4 illustrates an example of a process flow 400 that supports channel quality reporting using random access messages in accordance with aspects of the present disclosure. In some examples, process flow 400 may implement aspects of wireless communications systems 100 or 200. Process flow 400 includes UE 115-*b* and base station 105-*b*, which may be respective examples of a UE 115 and a base station 105 as described herein.

At 405, UE 115-*b* may transmit a RACH request message (e.g., a random access preamble, Msg1) to base station 105-*b*.

At 410, base station 105-*b* may transmit, and UE 115-*b* may receive, a first message of a RACH procedure. The first message may include a random access response message (e.g., Msg2) of the RACH procedure.

At 415, UE 115-*b* may identify channel quality information for a communication link between base station 105-*b* and UE 115-*b*. In some cases, at 415, UE 115-*b* may identify channel quality information that UE 115-*b* previously determined for the communication link, for example based on measurements by UE 115-*b* that occurred prior to receiving the first message of the RACH procedure 410.

At 420, UE 115-*b* may optionally identify a communication parameter for the communication link based on the identified channel quality information. In some examples, the identified channel quality information may include an indication of the identified communication parameter. In some cases, the identified communication parameter may include one or more of a transmission power, a modulation order, a coding rate, and an MCS. In some examples, UE 115-*b* may determine a number of repetitions for downlink transmissions. The determined number of repetitions may be different than a previous number of repetitions for downlink transmissions.

At 425, UE 115-*b* may transmit, and base station 105-*b* may receive, a second message of the RACH procedure. The second message may be a Msg3 in response to the first message of the RACH procedure transmitted by base station 105-*b* at 410. In some cases, UE 115-*b* may transmit the second message based on the determined number of repetitions being different than the previous number of repetitions. The second message may include an indication of the identified channel quality information contained in or conveyed by a portion of the second message generated by a single protocol layer of a control plane protocol stack. In some examples, the single protocol layer may be an RRC layer. In other examples, the single protocol layer may be the MAC layer. In some cases, the second message may include an RRC connection request message of the RACH procedure. In some examples, the indication may include a 1-bit indicator.

In some examples, UE 115-*b* may transmit the indication of the identified channel quality information in an RRC message. In other examples, UE 115-*b* may transmit the indication of the identified channel quality information in a header of a MAC PDU carrying the second message. In some cases, the MAC PDU may include a 1-bit channel quality field, and the indication of the identified channel quality information may be included in the 1-bit channel quality field. In other cases, the MAC PDU may include a 2-bit channel quality field, and the indication of the identified channel quality information may be included in the 2-bit channel quality field. In some examples, the MAC PDU header may include an LCID that indicates that the header carries channel quality information.

At 430, base station 105-*b* may optionally identify the communication parameter for the communication link based on the identified channel quality information. In some examples, the identified channel quality information may include the indication of the identified communication parameter. In some cases, the identified communication parameter may include one or more of a transmission power, a modulation order, a coding rate, a number of repetitions for a channel, or an MCS. In some examples, base station 105-*b* may determine a number of repetitions for downlink transmissions. The determined number of repetitions may be different than a previous number of repetitions for downlink transmissions.

Figure 5:
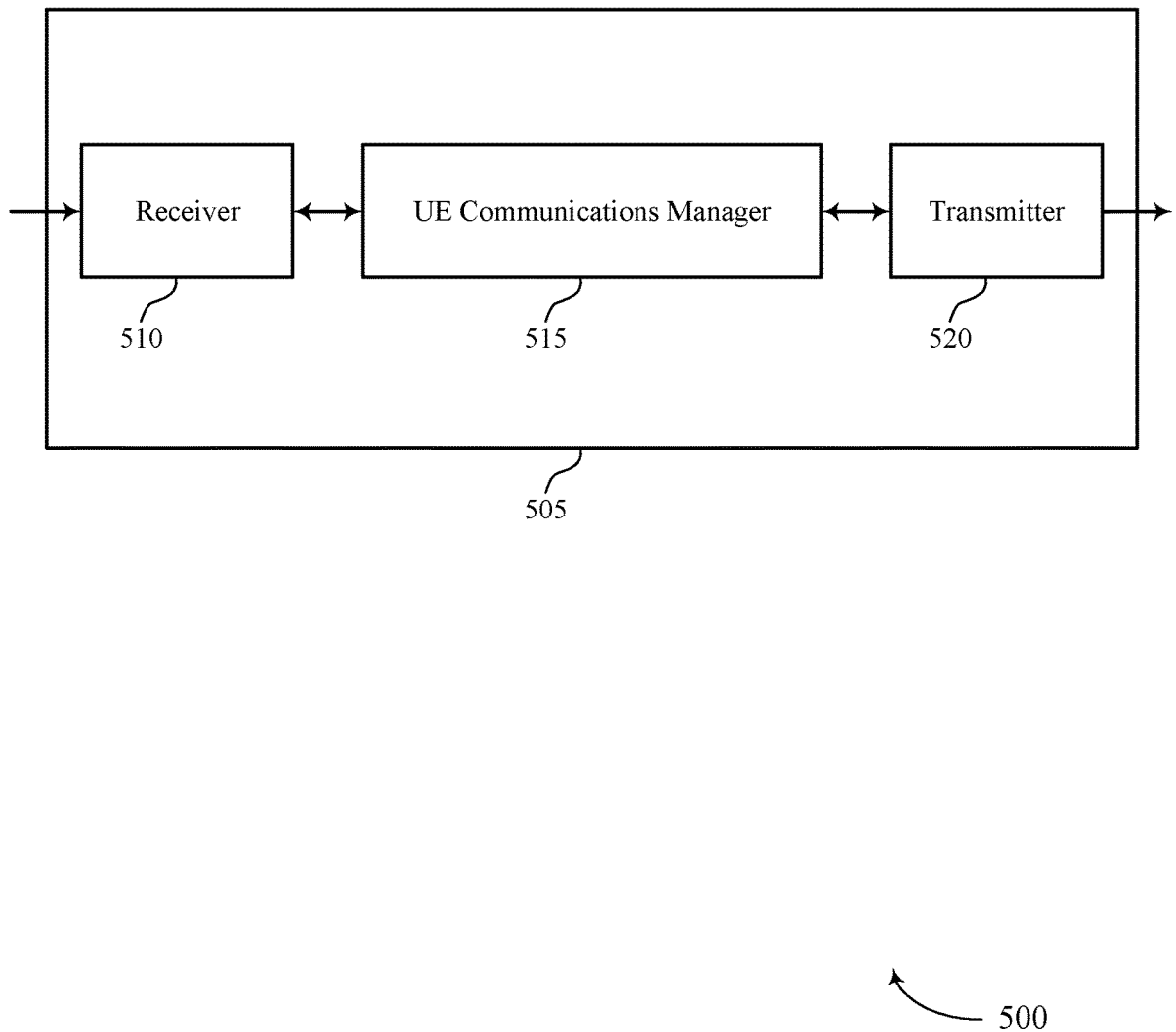
FIGS. 5 and 6 show block diagrams of a user equipment (UE) that supports channel quality reporting using random access messages in accordance with aspects of the present disclosure.

At 435, UE 115-*b* and base station 105-*b* may communicate based on the identified channel quality information transmitted in the second message FIG. 5 shows a block diagram 500 of a device 505 that supports channel quality reporting using random access messages in accordance with aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to channel quality reporting using random access messages). Information may be passed on to other components of the device 505. The receiver 510 may be an example of aspects of the transceiver 820 described with reference to FIG. 8. The receiver 510 may utilize a single antenna or a set of antennas.

The UE communications manager 515 may receive, from a base station, a first message of a random access procedure, identify channel quality information for a communication link between the base station and the UE, and transmit, to the base station and in response to the first message, a second message of the random access procedure, the second message including an indication of the identified channel quality information in a portion of the second message generated by a single protocol layer of a control plane protocol stack. The UE communications manager 515 may be an example of aspects of the UE communications manager 810 described herein.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

The UE communications manager 515 as described herein may be implemented to realize one or more potential advantages. One implementation may allow the device 505 to more efficiently coordinate communication between a base station and the device 505, and more specifically to transmit channel quality information from the device 505 to one or more base stations. For example, the device 505 may transmit an indication of channel quality information in a portion of a single protocol layer of a control plane protocol stack, based on a message received from the base station.

Based on implementing the channel quality information communication techniques as described herein, a processor of a UE 115 (e.g., controlling the receiver 510, the transmitter 520, or the transceiver 820 as described with reference to FIG. 8) may decrease signaling overhead, reduce resource usage, and reduce power consumption.

Figure 6:
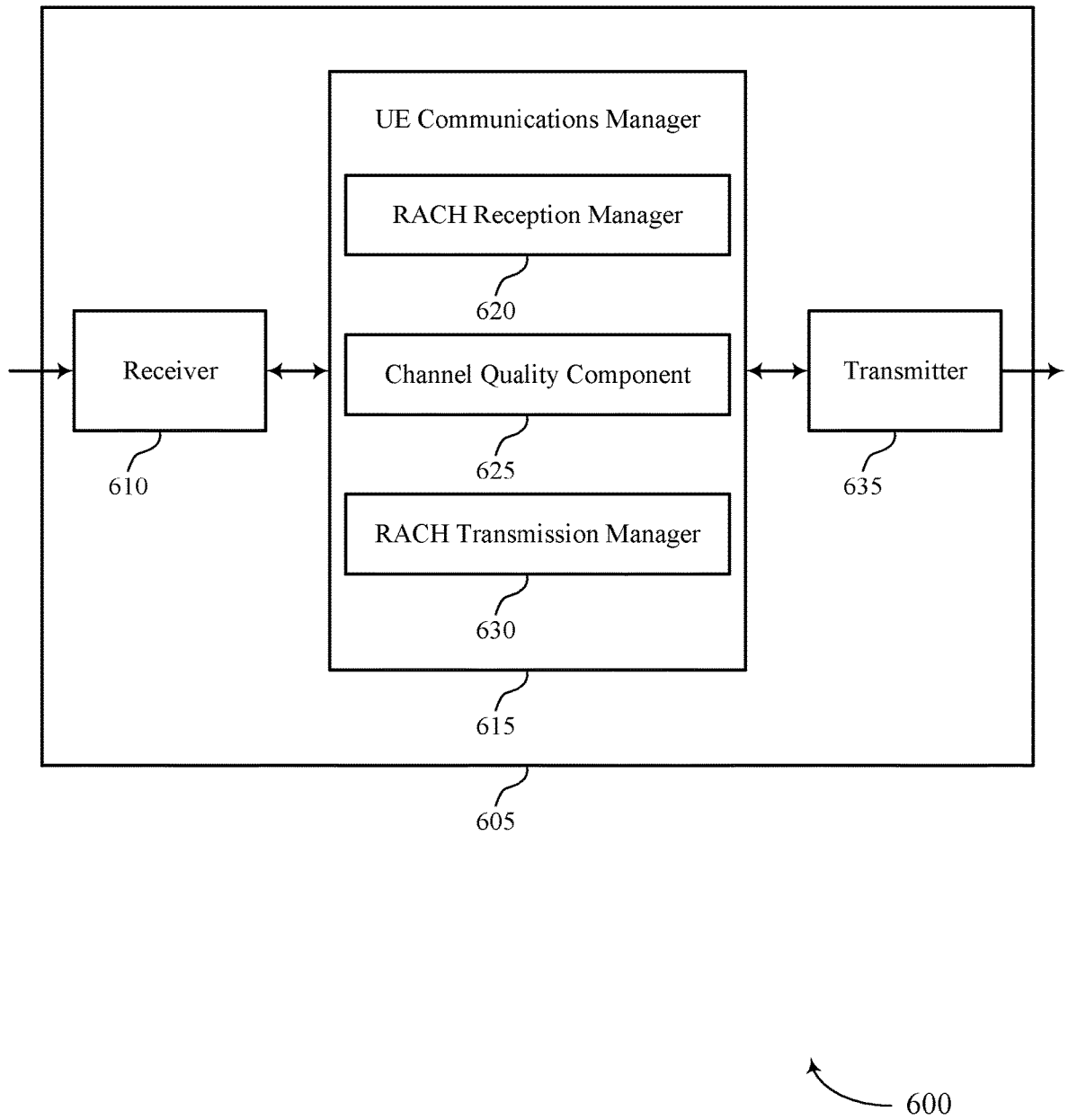

FIG. 6 shows a block diagram 600 of a device 605 that supports channel quality reporting using random access messages in accordance with aspects of the present disclosure. The device 605 may be an example of aspects of a device 505, or a UE 115 as described herein. The device 605 may include a receiver 610, a UE communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to channel quality reporting using random access messages). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a RACH reception manager 620, a channel quality component 625, and a RACH transmission manager 630. The UE communications manager 615 may be an example of aspects of the UE communications manager 810 described herein.

The RACH reception manager 620 may receive, from a base station, a first message of a random access procedure. The channel quality component 625 may identify channel quality information for a communication link between the base station and the UE.

The RACH transmission manager 630 may transmit, to the base station and in response to the first message, a second message of the random access procedure, the second message including an indication of the identified channel quality information in a portion of the second message generated by a single protocol layer of a control plane protocol stack.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
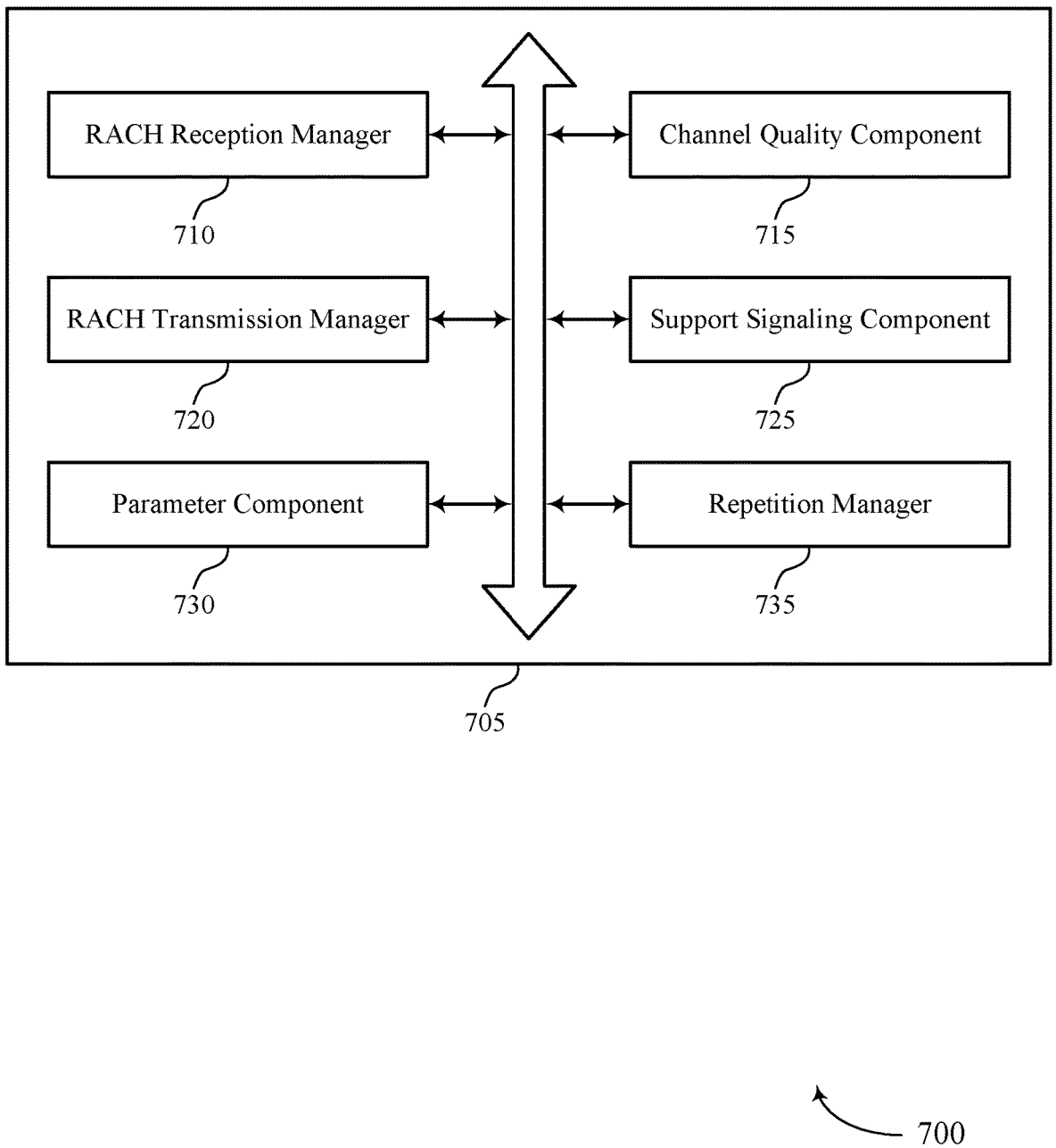
FIG. 7 shows a block diagram of a UE communications manager that supports channel quality reporting using random access messages in accordance with aspects of the present disclosure.

FIG. 7 shows a block diagram 700 of a UE communications manager 705 that supports channel quality reporting using random access messages in accordance with aspects of the present disclosure. The UE communications manager 705 may be an example of aspects of a UE communications manager 515, a UE communications manager 615, or a UE communications manager 810 described herein. The UE communications manager 705 may include a RACH reception manager 710, a channel quality component 715, a RACH transmission manager 720, a support signaling component 725, a parameter component 730, and a repetition manager 735. Each of these modules may communicate, directly or indirectly, with one another (e.g., via one or more buses).

The RACH reception manager 710 may receive, from a base station, a first message of a random access procedure. In some cases, the first message includes a random access response message of the random access procedure. The channel quality component 715 may identify channel quality information for a communication link between the base station and the UE.

The RACH transmission manager 720 may transmit, to the base station and in response to the first message, a second message of the random access procedure, the second message including an indication of the identified channel quality information in a portion of the second message generated by a single protocol layer of a control plane protocol stack. In some examples, the RACH transmission manager 720 may transmit the indication of the identified channel quality information in an RRC message. In some cases, the RACH transmission manager 720 may transmit the indication of the identified channel quality information in a header of a MAC PDU carrying the second message. In some aspects, the RACH transmission manager 720 may transmit the second message including the identified channel quality information based on the number of repetitions being different than the previous number of repetitions.

In some instances, the single protocol layer includes one of an RRC layer or a MAC layer of the control plane protocol stack. In some cases, the second message includes an RRC connection request message of the random access procedure. In some examples, the header of the MAC PDU includes a 2-bit channel quality field. In some aspects, the indication of the identified channel quality information is included in the 2-bit channel quality field. In some instances, the header of the MAC PDU includes an LCID that indicates that the header carries channel quality information. In some cases, the indication includes a 1-bit indicator. In some examples, the header of the MAC PDU includes a 1-bit channel quality field. In some aspects, the indication of the identified channel quality information is included in the 1-bit channel quality field.

The support signaling component 725 may receive signaling that indicates support, by the base station, of the header carrying channel quality information. The parameter component 730 may identify a communication parameter for the communication link based on the identified channel quality information, where the indication of the identified channel quality information includes an indication of the identified communication parameter. In some cases, the identified communication parameter includes a transmission power, a modulation order, a coding rate, an MCS, a number of repetitions for a control channel or a shared channel, or a combination thereof.

The repetition manager 735 may determine a number of repetitions for downlink transmissions, the number of repetitions being different than a previous number of repetitions for downlink transmissions.

Figure 8:
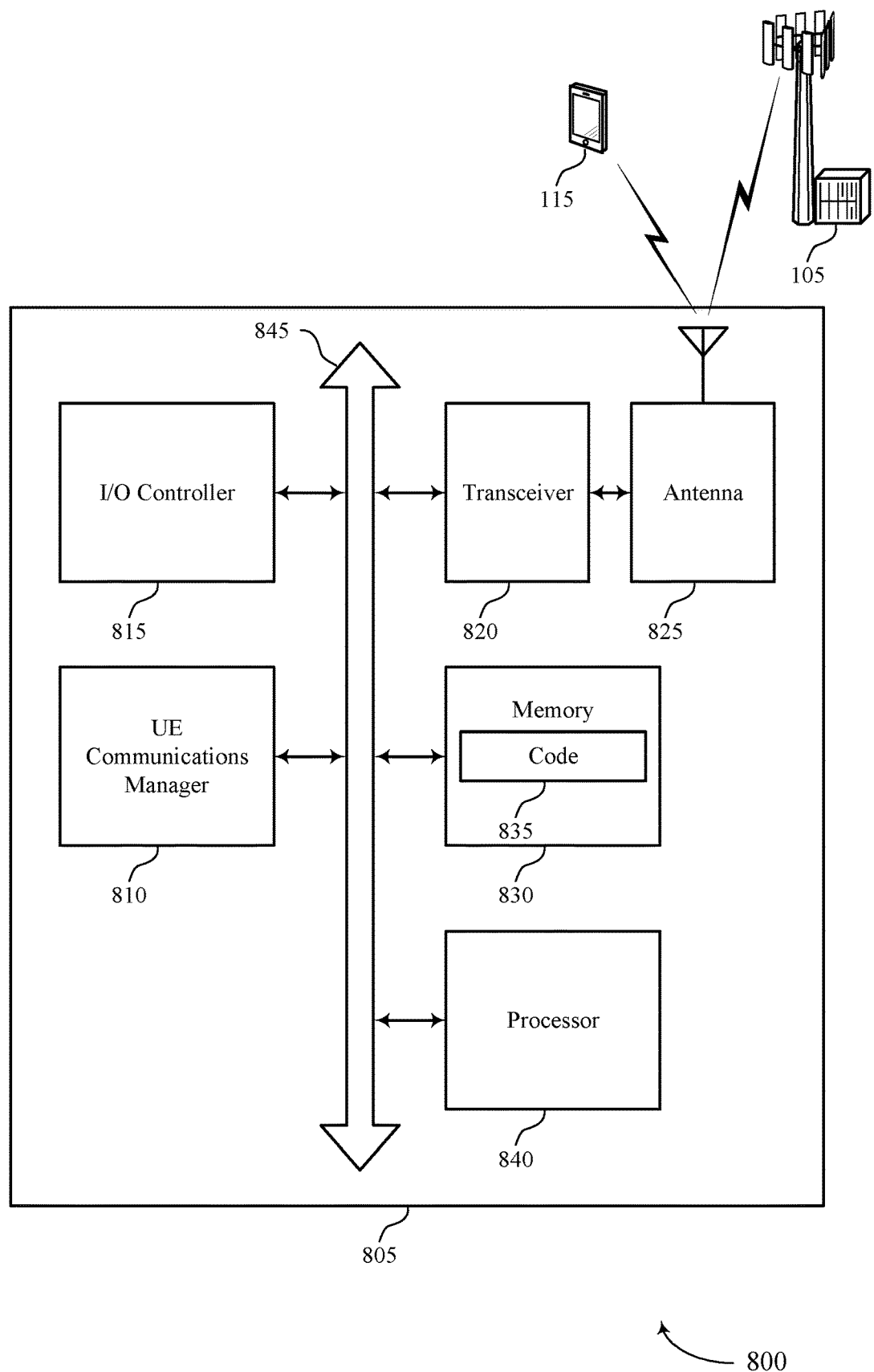
FIG. 8 shows a diagram of a system including a UE that supports channel quality reporting using random access messages in accordance with aspects of the present disclosure.

FIG. 8 shows a diagram of a system 800 including a device 805 that supports channel quality reporting using random access messages in accordance with aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may receive, from a base station, a first message of a random access procedure, identify channel quality information for a communication link between the base station and the UE, and transmit, to the base station and in response to the first message, a second message of the random access procedure, the second message including an indication of the identified channel quality information in a portion of the second message generated by a single protocol layer of a control plane protocol stack.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the device 805 may include a single antenna 825. However, in some cases, the device 805 may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting channel quality reporting using random access messages).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
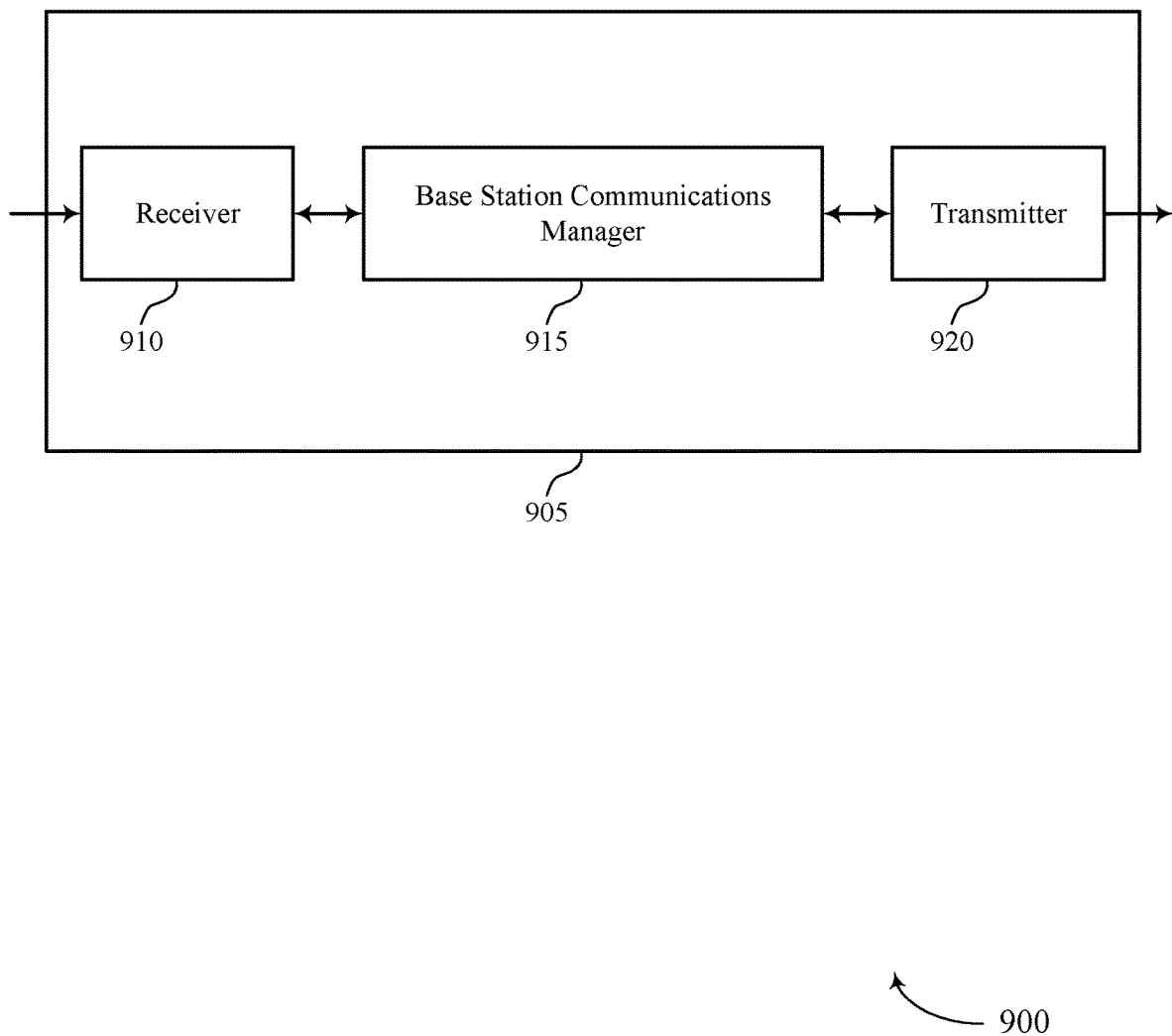
FIGS. 9 and 10 show block diagrams of a base station that supports channel quality reporting using random access messages in accordance with aspects of the present disclosure.

FIG. 9 shows a block diagram 900 of a device 905 that supports channel quality reporting using random access messages in accordance with aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to channel quality reporting using random access messages). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may transmit, to a UE, a first message of a random access procedure and receive, from the UE and in response to the first message, a second message of the random access procedure, the second message including an indication of channel quality information for a communication link between the base station and the UE, the indication in a portion of the second message associated with a single protocol layer of a control plane protocol stack. The base station communications manager 915 may be an example of aspects of the base station communications manager 1210 described herein.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
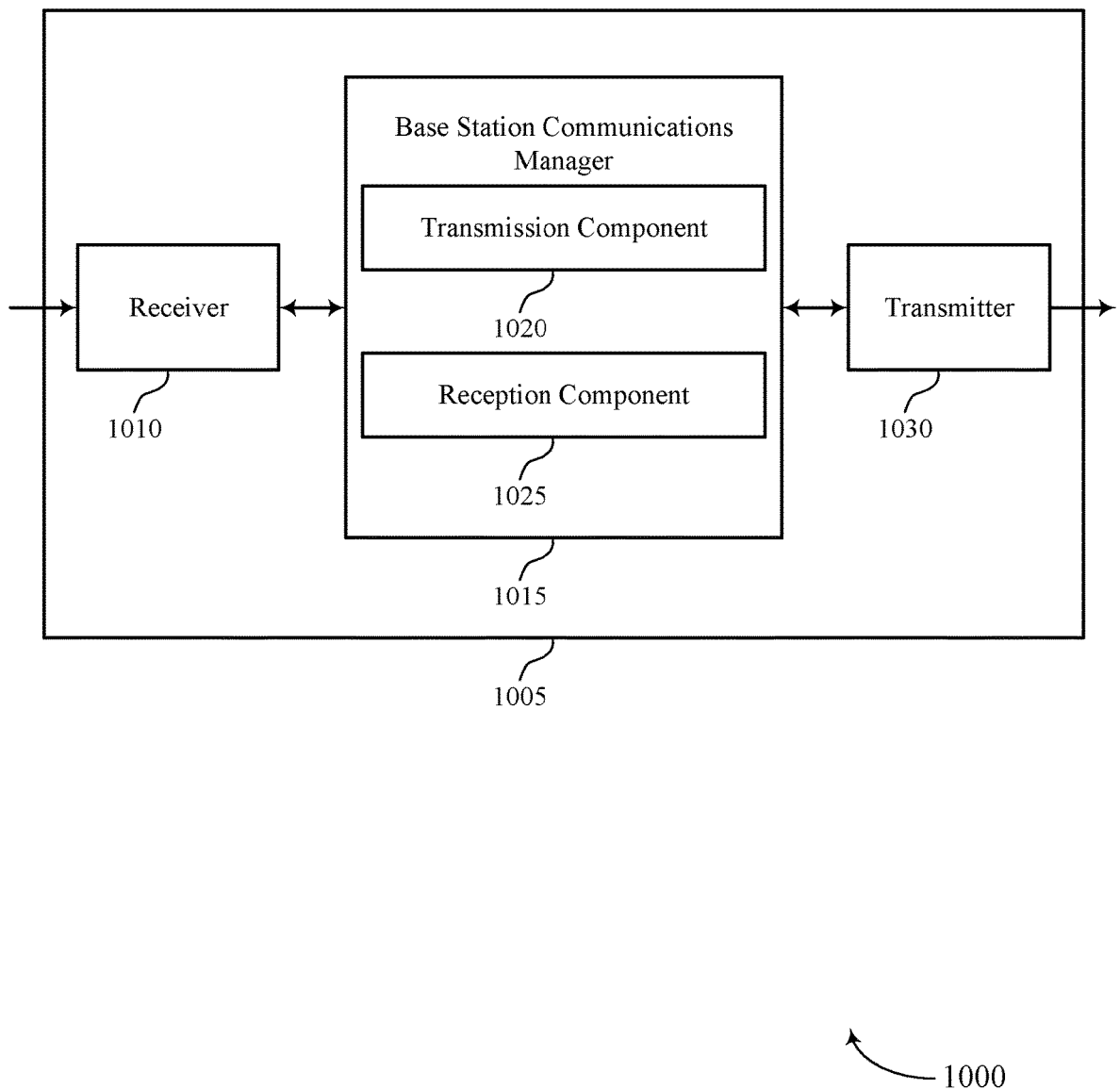

FIG. 10 shows a block diagram 1000 of a device 1005 that supports channel quality reporting using random access messages in accordance with aspects of the present disclosure. The device 1005 may be an example of aspects of a device 905, or a base station 105 as described herein. The device 1005 may include a receiver 1010, a base station communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to channel quality reporting using random access messages). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a transmission component 1020 and a reception component 1025. The base station communications manager 1015 may be an example of aspects of the base station communications manager 1210 described herein.

The transmission component 1020 may transmit, to a UE, a first message of a random access procedure. The reception component 1025 may receive, from the UE and in response to the first message, a second message of the random access procedure, the second message including an indication of channel quality information for a communication link between the base station and the UE, the indication in a portion of the second message associated with a single protocol layer of a control plane protocol stack.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
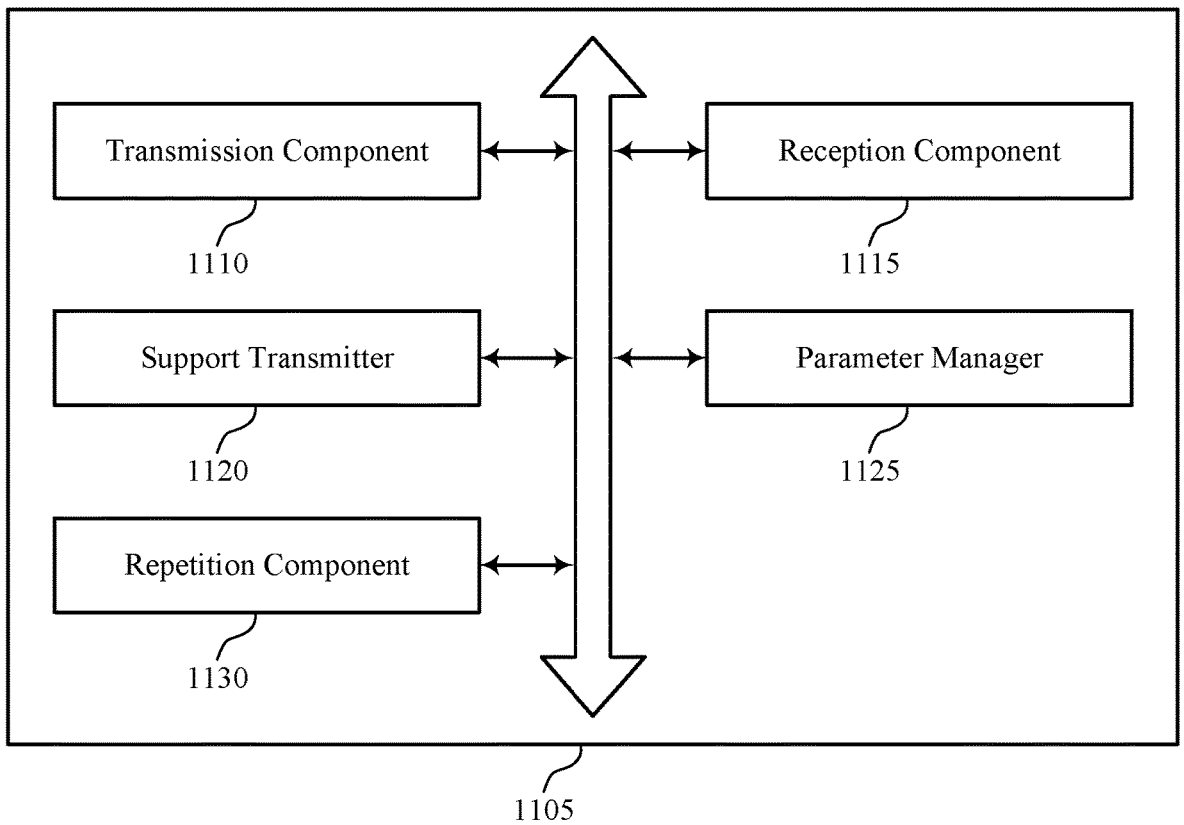
FIG. 11 shows a block diagram of a base station communications manager that supports channel quality reporting using random access messages in accordance with aspects of the present disclosure.

FIG. 11 shows a block diagram 1100 of a base station communications manager 1105 that supports channel quality reporting using random access messages in accordance with aspects of the present disclosure. The base station communications manager 1105 may be an example of aspects of a base station communications manager 915, a base station communications manager 1015, or a base station communications manager 1210 described herein. The base station communications manager 1105 may include a transmission component 1110, a reception component 1115, a support transmitter 1120, a parameter manager 1125, and a repetition component 1130. Each of these modules may communicate, directly or indirectly, with one another (e.g., via one or more buses).

The transmission component 1110 may transmit, to a UE, a first message of a random access procedure. In some cases, the first message includes a random access response message of the random access procedure.

The reception component 1115 may receive, from the UE and in response to the first message, a second message of the random access procedure, the second message including an indication of channel quality information for a communication link between the base station and the UE, the indication in a portion of the second message associated with a single protocol layer of a control plane protocol stack. In some examples, the reception component 1115 may receive the indication of the identified channel quality information in an RRC message. In some cases, the reception component 1115 may receive the indication of the identified channel quality information in a header of a MAC PDU carrying the second message. In some aspects, the reception component 1115 may receive the second message including the channel quality information based on the number of repetitions being different than the previous number of repetitions.

In some instances, the single protocol layer includes one of an RRC layer or a MAC layer of the control plane protocol stack. In some cases, the second message includes an RRC connection request message of the random access procedure. In some examples, the header of the MAC PDU includes a 2-bit channel quality field. In some aspects, the indication of the channel quality information is included in the 2-bit channel quality field. In some cases, the header of the MAC PDU includes an LCID that indicates that the header carries channel quality information. In some examples, the header of the MAC PDU includes a 1-bit channel quality field. In some aspects, the indication of the channel quality information is included in the 1-bit channel quality field.

The support transmitter 1120 may transmit signaling that indicates support, by the base station, of the header carrying channel quality information.

The parameter manager 1125 may identify a communication parameter for the communication link based on the channel quality information, where the indication of the channel quality information includes an indication of the identified communication parameter. In some cases, the identified communication parameter includes a transmission power, a modulation order, a coding rate, an MCS, a number of repetitions for a control channel or a shared channel, or a combination thereof.

The repetition component 1130 may determine a number of repetitions for downlink transmissions, the number of repetitions being different than a previous number of repetitions for downlink transmissions.

Figure 12:
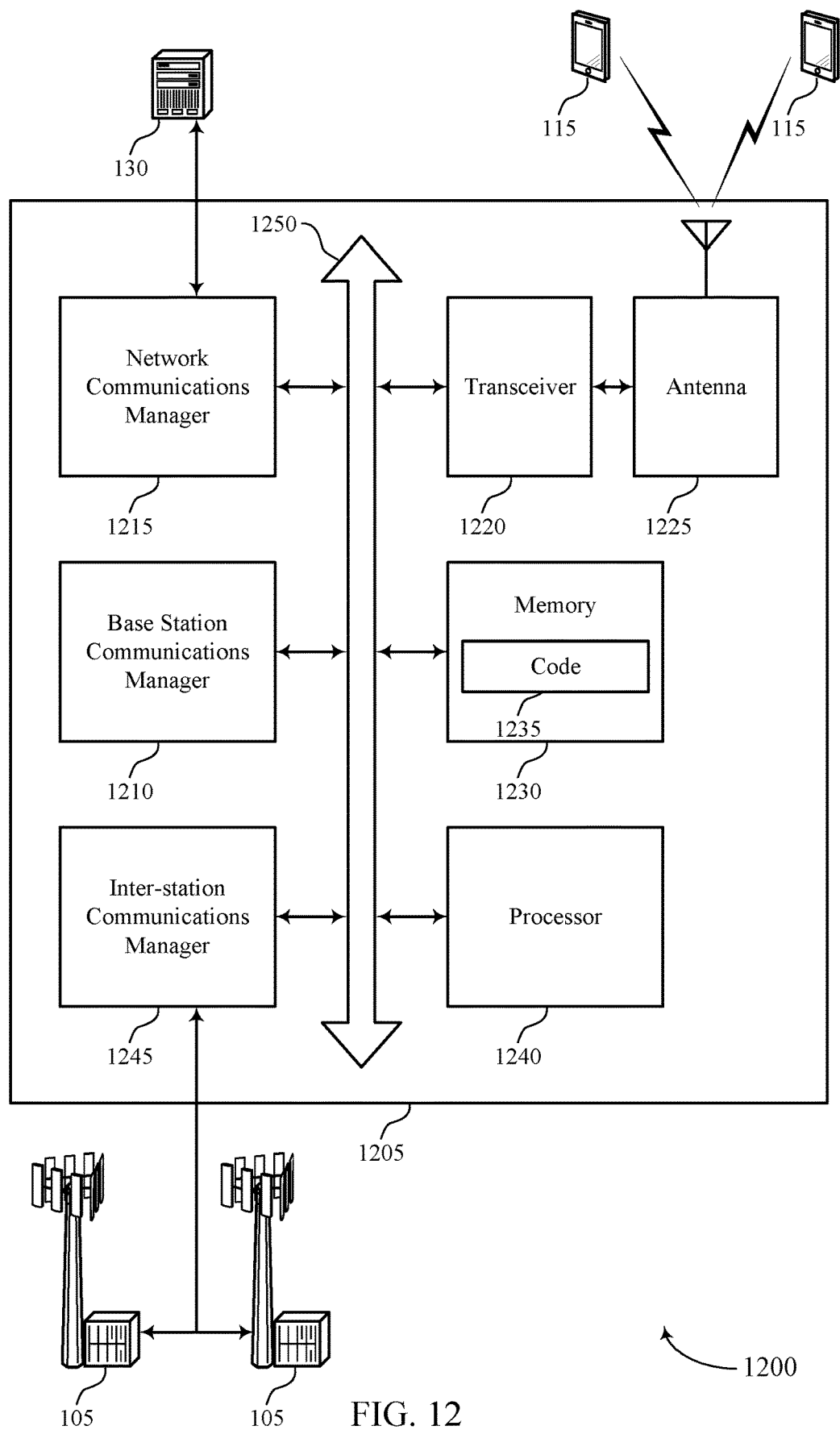
FIG. 12 shows a diagram of a system including a base station that supports channel quality reporting using random access messages in accordance with aspects of the present disclosure.

FIG. 12 shows a diagram of a system 1200 including a device 1205 that supports channel quality reporting using random access messages in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may transmit, to a UE, a first message of a random access procedure and receive, from the UE and in response to the first message, a second message of the random access procedure, the second message including an indication of channel quality information for a communication link between the base station and the UE, the indication in a portion of the second message associated with a single protocol layer of a control plane protocol stack.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the device 1205 may include a single antenna 1225. However, in some cases, the device 1205 may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting channel quality reporting using random access messages).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
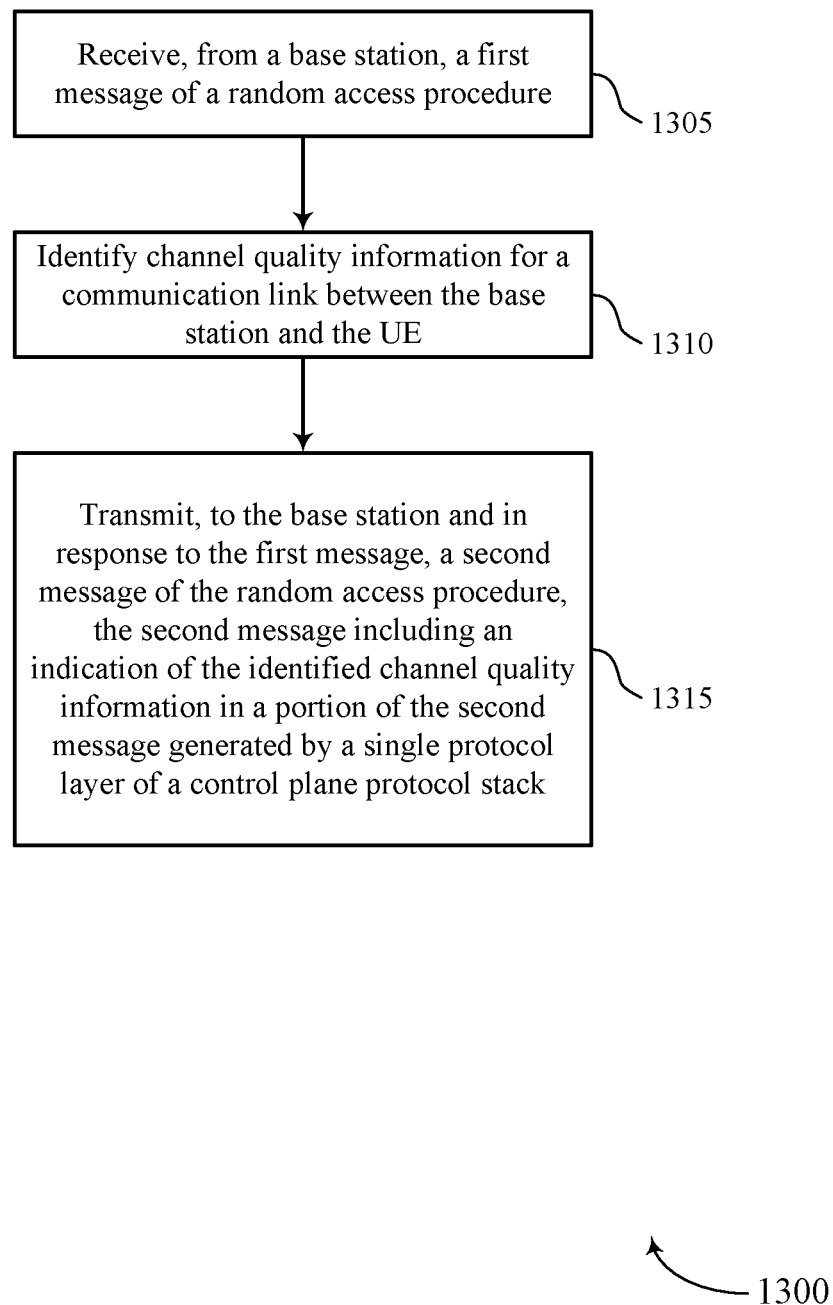
FIGS. 13 through 18 show flowcharts illustrating methods that support channel quality reporting using random access messages in accordance with aspects of the present disclosure.

FIG. 13 shows a flowchart illustrating a method 1300 that supports channel quality reporting using random access messages in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, a first message of a random access procedure. The operations of 1305 may be performed according to the methods described herein. In some examples, aspects of the operations of 1305 may be performed by a RACH reception manager as described with reference to FIGS. 5 through 8.

At 1310, the UE may identify channel quality information for a communication link between the base station and the UE. The operations of 1310 may be performed according to the methods described herein. In some examples, aspects of the operations of 1310 may be performed by a channel quality component as described with reference to FIGS. 5 through 8.

At 1315, the UE may transmit, to the base station and in response to the first message, a second message of the random access procedure, the second message including an indication of the identified channel quality information in a portion of the second message generated by a single protocol layer of a control plane protocol stack. The operations of 1315 may be performed according to the methods described herein. In some examples, aspects of the operations of 1315 may be performed by a RACH transmission manager as described with reference to FIGS. 5 through 8.

Figure 14:
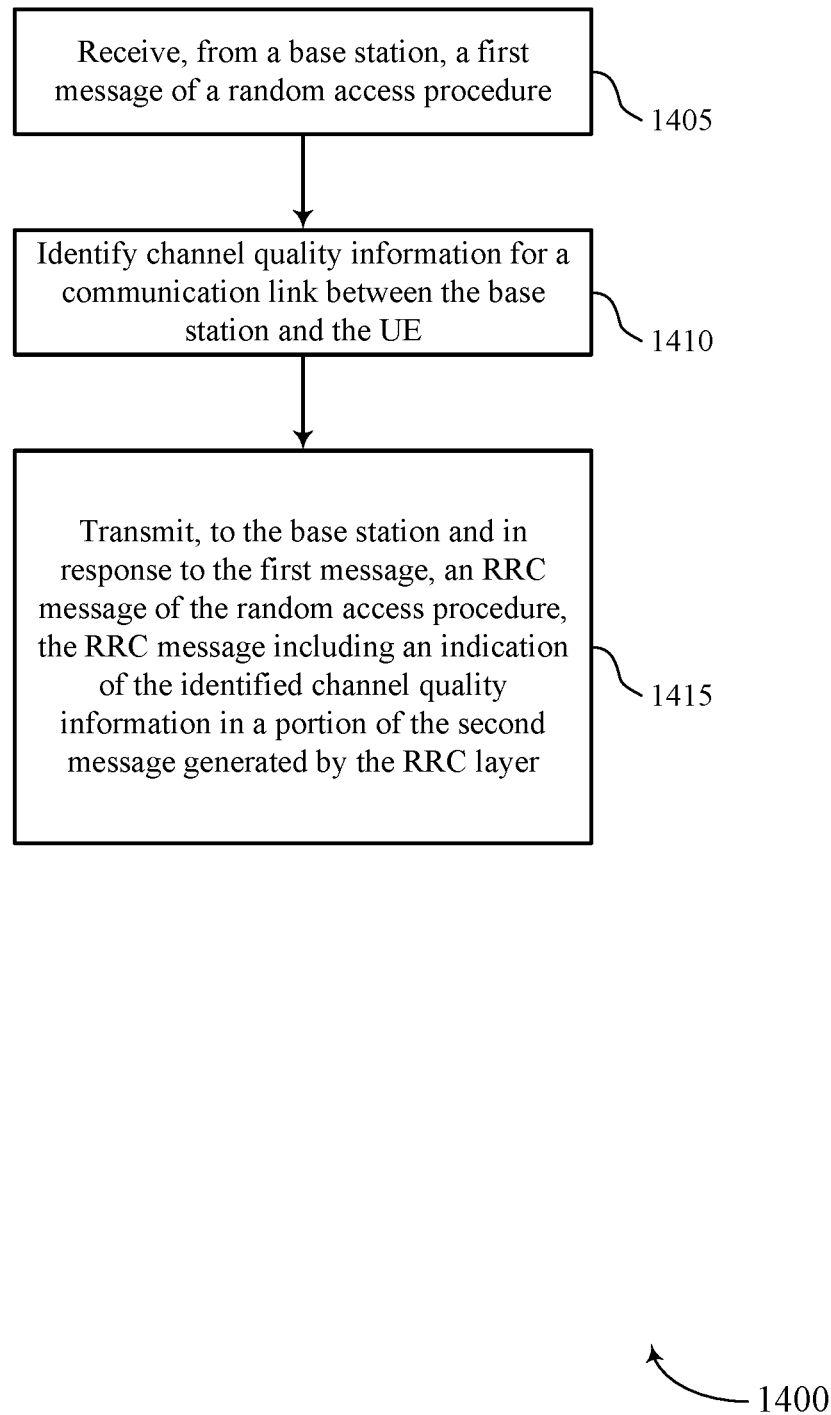

FIG. 14 shows a flowchart illustrating a method 1400 that supports channel quality reporting using random access messages in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, a first message of a random access procedure. The operations of 1405 may be performed according to the methods described herein. In some examples, aspects of the operations of 1405 may be performed by a RACH reception manager as described with reference to FIGS. 5 through 8.

At 1410, the UE may identify channel quality information for a communication link between the base station and the UE. The operations of 1410 may be performed according to the methods described herein. In some examples, aspects of the operations of 1410 may be performed by a channel quality component as described with reference to FIGS. 5 through 8.

At 1415, the UE may transmit, to the base station and in response to the first message, an RRC message of the random access procedure, the RRC message including an indication of the identified channel quality information in a portion of the second message generated by the RRC layer. The operations of 1415 may be performed according to the methods described herein. In some examples, aspects of the operations of 1415 may be performed by a RACH transmission manager as described with reference to FIGS. 5 through 8.

Figure 15:
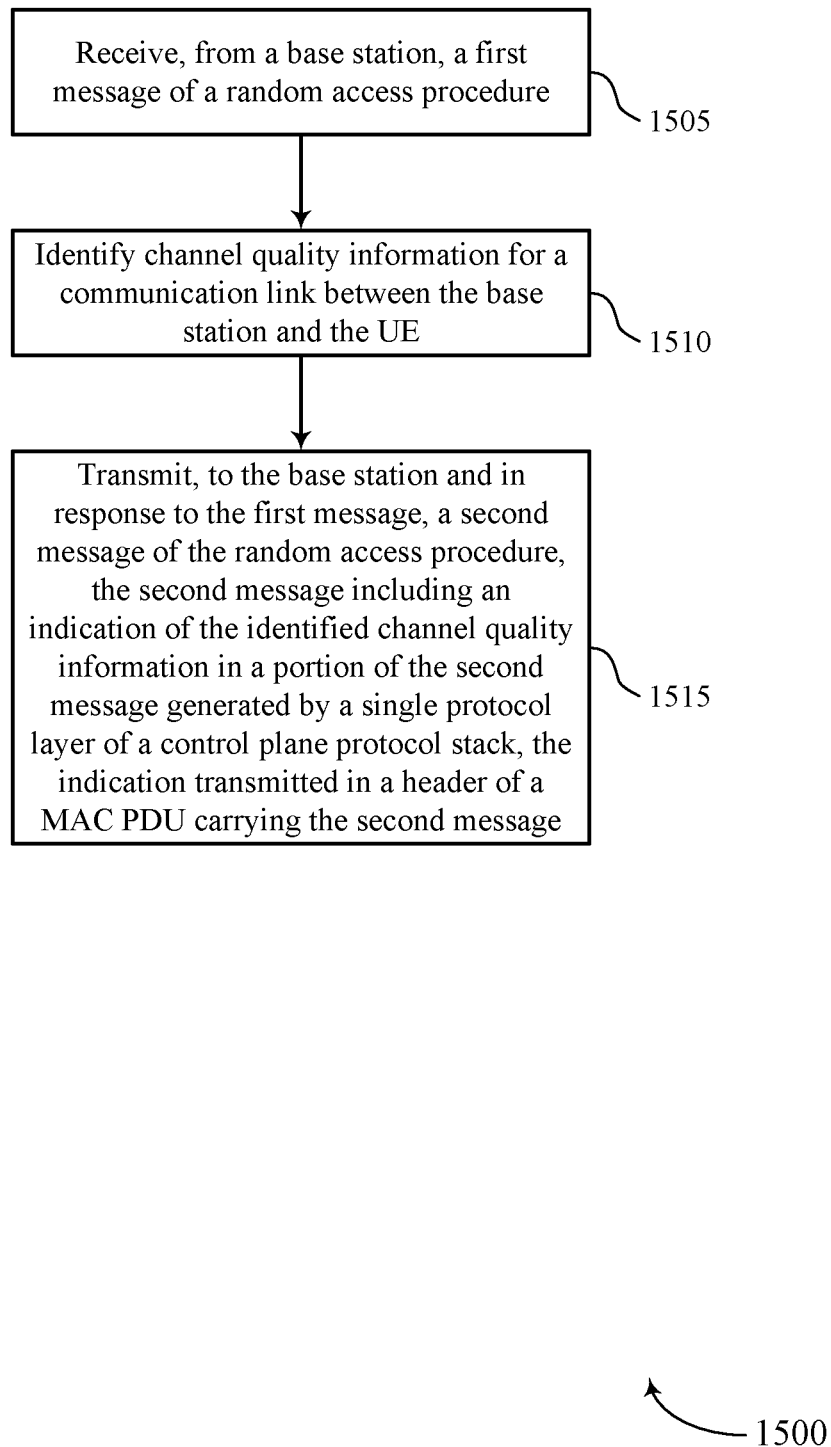

FIG. 15 shows a flowchart illustrating a method 1500 that supports channel quality reporting using random access messages in accordance with aspects of the present disclosure. The operations of method 1500 may be implemented by a UE 115 or its components as described herein. For example, the operations of method 1500 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a first message of a random access procedure. The operations of 1505 may be performed according to the methods described herein. In some examples, aspects of the operations of 1505 may be performed by a RACH reception manager as described with reference to FIGS. 5 through 8.

At 1510, the UE may identify channel quality information for a communication link between the base station and the UE. The operations of 1510 may be performed according to the methods described herein. In some examples, aspects of the operations of 1510 may be performed by a channel quality component as described with reference to FIGS. 5 through 8.

At 1515, the UE may transmit, to the base station and in response to the first message, a second message of the random access procedure, the second message including an indication of the identified channel quality information in a portion of the second message generated by a single protocol layer of a control plane protocol stack, the indication transmitted in a header of a MAC PDU carrying the second message. The operations of 1515 may be performed according to the methods described herein. In some examples, aspects of the operations of 1515 may be performed by a RACH transmission manager as described with reference to FIGS. 5 through 8.

Figure 16:
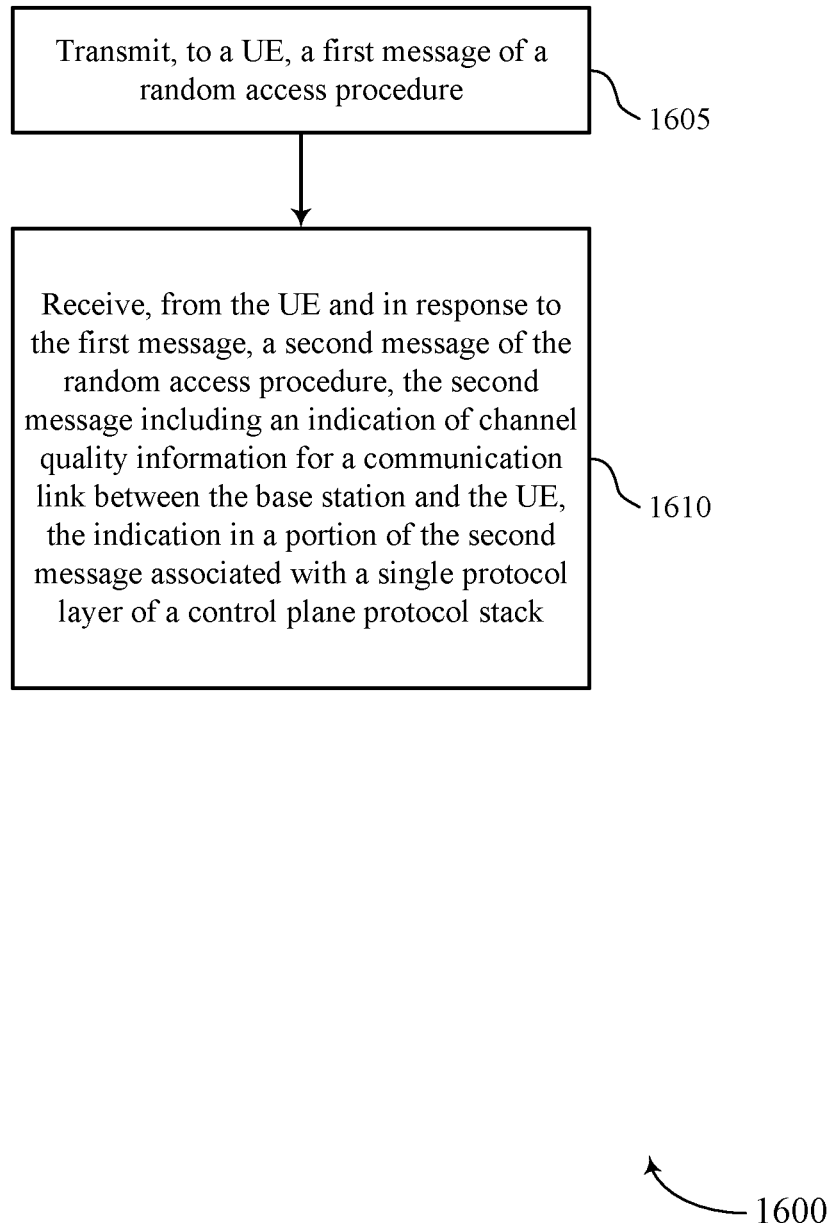

FIG. 16 shows a flowchart illustrating a method 1600 that supports channel quality reporting using random access messages in accordance with aspects of the present disclosure. The operations of method 1600 may be implemented by a base station 105 or its components as described herein. For example, the operations of method 1600 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE, a first message of a random access procedure. The operations of 1605 may be performed according to the methods described herein. In some examples, aspects of the operations of 1605 may be performed by a transmission component as described with reference to FIGS. 9 through 12.

At 1610, the base station may receive, from the UE and in response to the first message, a second message of the random access procedure, the second message including an indication of channel quality information for a communication link between the base station and the UE, the indication in a portion of the second message associated with a single protocol layer of a control plane protocol stack. The operations of 1610 may be performed according to the methods described herein. In some examples, aspects of the operations of 1610 may be performed by a reception component as described with reference to FIGS. 9 through 12.

Figure 17:
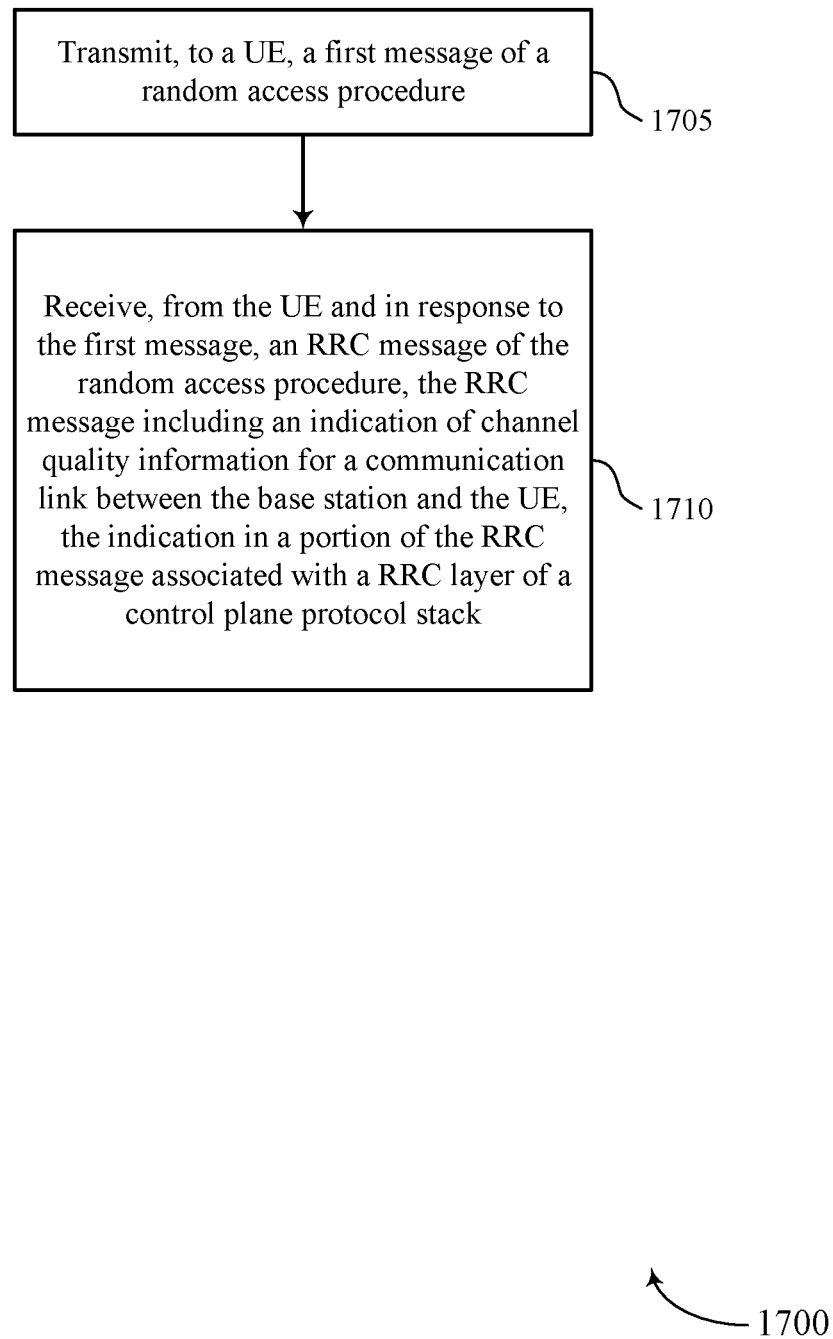

FIG. 17 shows a flowchart illustrating a method 1700 that supports channel quality reporting using random access messages in accordance with aspects of the present disclosure. The operations of method 1700 may be implemented by a base station 105 or its components as described herein. For example, the operations of method 1700 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, a first message of a random access procedure. The operations of 1705 may be performed according to the methods described herein. In some examples, aspects of the operations of 1705 may be performed by a transmission component as described with reference to FIGS. 9 through 12.

At 1710, the base station may receive, from the UE and in response to the first message, an RRC message of the random access procedure, the RRC message including an indication of channel quality information for a communication link between the base station and the UE, the indication in a portion of the RRC message associated with an RRC layer of a control plane protocol stack. The operations of 1710 may be performed according to the methods described herein. In some examples, aspects of the operations of 1710 may be performed by a reception component as described with reference to FIGS. 9 through 12.

Figure 18:
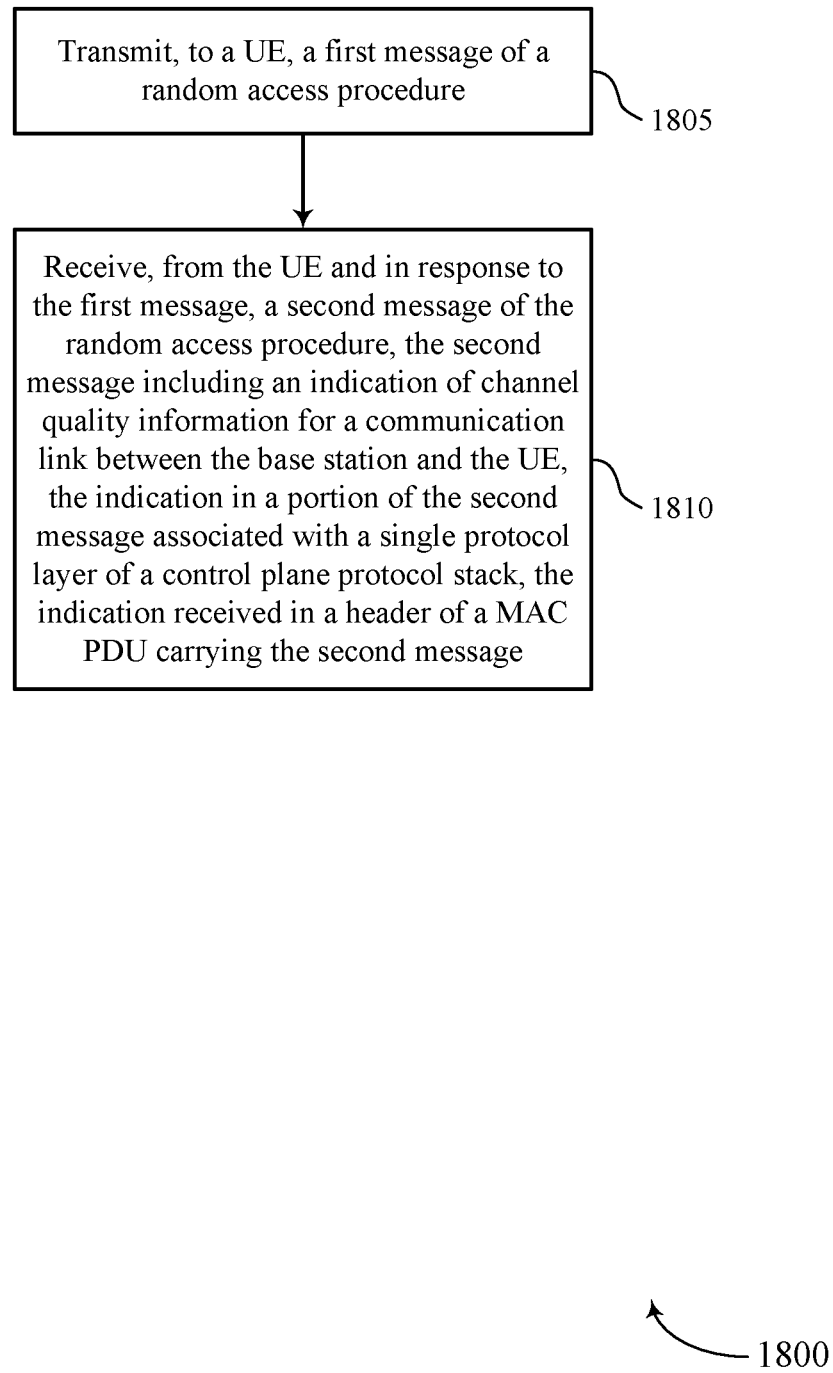

FIG. 18 shows a flowchart illustrating a method 1800 that supports channel quality reporting using random access messages in accordance with aspects of the present disclosure. The operations of method 1800 may be implemented by a base station 105 or its components as described herein. For example, the operations of method 1800 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, a first message of a random access procedure. The operations of 1805 may be performed according to the methods described herein. In some examples, aspects of the operations of 1805 may be performed by a transmission component as described with reference to FIGS. 9 through 12.

At 1810, the base station may receive, from the UE and in response to the first message, a second message of the random access procedure, the second message including an indication of channel quality information for a communication link between the base station and the UE, the indication in a portion of the second message associated with a single protocol layer of a control plane protocol stack, the indication received in a header of a MAC PDU carrying the second message. The operations of 1810 may be performed according to the methods described herein. In some examples, aspects of the operations of 1810 may be performed by a reception component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier FDMA (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications of a user equipment (UE), comprising:
   receiving, from a network device, a first message of a random access procedure;
   identifying channel quality information for a communication link between the network device and the UE; and
   transmitting, to the network device and in response to the first message, a second message of the random access procedure, the second message comprising an indication of the identified channel quality information in a multi-bit channel quality field of the second message associated with a single protocol layer of a control plane protocol stack based at least in part on a capability of the network device to support the second message comprising the indication of the identified channel quality information and based at least in part on a determination to change a number of repetitions for downlink transmissions.

2. The method of claim 1, wherein the single protocol layer comprises one of a radio resource control (RRC) layer or a media access control (MAC) layer of the control plane protocol stack.

3. The method of claim 1, wherein:
   the first message comprises a random access response message of the random access procedure; and
   the second message comprises a radio resource control (RRC) connection request message of the random access procedure.

4. The method of claim 1, wherein transmitting the second message comprises:
   transmitting the indication of the identified channel quality information in a header of a media access control (MAC) protocol data unit (PDU) carrying the second message.

5. The method of claim 4, wherein:
   the header of the MAC PDU comprises a 2 bit channel quality field; and
   the indication of the identified channel quality information is included in the 2 bit channel quality field.

6. The method of claim 4, wherein the header of the MAC PDU comprises a logical channel identifier (LCID) that indicates that the header carries channel quality information.

7. The method of claim 1, further comprising:
   receiving signaling that indicates that the network device supports a header of the second message carrying channel quality information.

8. The method of claim 1, further comprising:
   identifying a communication parameter for the communication link based at least in part on the identified channel quality information, wherein the indication of the identified channel quality information comprises an indication of the identified communication parameter.

9. The method of claim 8, wherein the identified communication parameter comprises a transmission power, a modulation order, a coding rate, a modulation and coding scheme (MCS), a number of repetitions for a control channel or a shared channel, or a combination thereof.

10. The method of claim 1, further comprising:
    determining the number of repetitions for downlink transmissions, the number of repetitions being different than a previous number of repetitions for the downlink transmissions; and
    transmitting the second message including the identified channel quality information based at least in part on the number of repetitions being different than the previous number of repetitions.

11. A method for wireless communications of a network device, comprising:
    transmitting a first message of a random access procedure; and
    receiving in response to the first message, a second message of the random access procedure, the second message comprising an indication of channel quality information for a communication link between the network device and a user equipment (UE), the indication in a multi-bit channel quality field of the second message associated with a single protocol layer of a control plane protocol stack based at least in part on a capability of the network device to support the second message comprising the indication of the channel quality information and based at least in part on a determination to change a number of repetitions for downlink transmissions.

12. The method of claim 11, wherein the single protocol layer comprises one of a radio resource control (RRC) layer or a media access control (MAC) layer of the control plane protocol stack.

13. The method of claim 11, wherein:
    the first message comprises a random access response message of the random access procedure; and
    the second message comprises a radio resource control (RRC) connection request message of the random access procedure.

14. The method of claim 11, wherein receiving the second message comprises:
    receiving the indication of the channel quality information in a header of a media access control (MAC) protocol data unit (PDU) carrying the second message.

15. The method of claim 14, wherein:
    the header of the MAC PDU comprises a 2 bit channel quality field; and
    the indication of the channel quality information is included in the 2 bit channel quality field.

16. The method of claim 14, wherein the header of the MAC PDU comprises a logical channel identifier (LCID) that indicates that the header carries channel quality information.

17. The method of claim 14, further comprising:
    transmitting signaling that indicates that the network device supports a header of the second message carrying channel quality information.

18. The method of claim 11, further comprising:
    identifying a communication parameter for the communication link based at least in part on the channel quality information, wherein the indication of the channel quality information comprises an indication of the identified communication parameter.

19. The method of claim 18, wherein the identified communication parameter comprises a transmission power, a modulation order, a coding rate, a modulation and coding scheme (MCS), a number of repetitions for a control channel or a shared channel, or a combination thereof.

20. The method of claim 11, further comprising:
    determining the number of repetitions for downlink transmissions, the number of repetitions being different than a previous number of repetitions for the downlink transmissions; and receiving the second message including the channel quality information based at least in part on the number of repetitions being different than the previous number of repetitions.

21. An apparatus for wireless communications of a user equipment (UE), comprising:
a processor,
memory coupled with the processor; and
instructions stored in the memory and executable by the processor to cause the UE to:
receive, from a network device, a first message of a random access procedure;
identify channel quality information for a communication link between the network device and the UE; and
transmit, to the network device and in response to the first message, a second message of the random access procedure, the second message comprising an indication of the identified channel quality information in a multi-bit channel quality field of the second message associated with a single protocol layer of a control plane protocol stack based at least in part on a capability of the network device to support the second message comprising the indication of the identified channel quality information and based at least in part on a determination to change a number of repetitions for downlink transmissions.

22. The apparatus of claim 21, wherein the single protocol layer comprises one of a radio resource control (RRC) layer or a media access control (MAC) layer of the control plane protocol stack.

23. The apparatus of claim 21, wherein:
the first message comprises a random access response message of the random access procedure; and
the second message comprises a radio resource control (RRC) connection request message of the random access procedure.

24. The apparatus of claim 21, wherein the instructions to transmit the second message are executable by the processor to cause the UE to:
transmit the indication of the identified channel quality information in a header of a media access control (MAC) protocol data unit (PDU) carrying the second message.

25. The apparatus of claim 24, wherein:
the header of the MAC PDU comprises a 2 bit channel quality field; and
the indication of the identified channel quality information is included in the 2 bit channel quality field.

26. The apparatus of claim 24, wherein the header of the MAC PDU comprises a logical channel identifier (LCID) that indicates that the header carries channel quality information.

27. The apparatus of claim 24, wherein the instructions are further executable by the processor to cause the UE to:
receive signaling that indicates that the network device supports a header of the second message carrying channel quality information.

28. The apparatus of claim 21, wherein the instructions are further executable by the processor to cause the UE to:
identify a communication parameter for the communication link based at least in part on the identified channel quality information, wherein the indication of the identified channel quality information comprises an indication of the identified communication parameter.

29. The apparatus of claim 28, wherein the identified communication parameter comprises a transmission power, a modulation order, a coding rate, a modulation and coding scheme (MCS), a number of repetitions for a control channel or a shared channel, or a combination thereof.

30. The apparatus of claim 21, wherein the instructions are further executable by the processor to cause the UE to:
determine the number of repetitions for downlink transmissions, the number of repetitions being different than a previous number of repetitions for the downlink transmissions; and
transmit the second message including the identified channel quality information based at least in part on the number of repetitions being different than the previous number of repetitions.

31. An apparatus for wireless communications of a network device, comprising:
a processor,
memory coupled with the processor; and
instructions stored in the memory and executable by the processor to cause the network device to:
transmit a first message of a random access procedure; and
receive, in response to the first message, a second message of the random access procedure, the second message comprising an indication of channel quality information for a communication link between the network device and a user equipment (UE), the indication in a multi-bit channel quality field of the second message associated with a single protocol layer of a control plane protocol stack based at least in part on a capability of the network device to support the second message comprising the indication of the channel quality information and based at least in part on a determination to change a number of repetitions for downlink transmissions.

32. The apparatus of claim 31, wherein the single protocol layer comprises one of a radio resource control (RRC) layer or a media access control (MAC) layer of the control plane protocol stack.

33. The apparatus of claim 31, wherein:
the first message comprises a random access response message of the random access procedure; and
the second message comprises a radio resource control (RRC) connection request message of the random access procedure.

34. The apparatus of claim 31, wherein the instructions to receive the second message are executable by the processor to cause the network device to:
receive the indication of the channel quality information in a header of a media access control (MAC) protocol data unit (PDU) carrying the second message.

35. The apparatus of claim 34, wherein:
the header of the MAC PDU comprises a 2 bit channel quality field; and
the indication of the channel quality information is included in the 2 bit channel quality field.

36. The apparatus of claim 34, wherein the header of the MAC PDU comprises a logical channel identifier (LCID) that indicates that the header carries channel quality information.

37. The apparatus of claim 34, wherein the instructions are further executable by the processor to cause the network device to:
transmit signaling that indicates that the network device supports a header of the second message carrying channel quality information.

38. The apparatus of claim 31, wherein the instructions are further executable by the processor to cause the network device to:
identify a communication parameter for the communication link based at least in part on the channel quality information, wherein the indication of the channel quality information comprises an indication of the identified communication parameter.

39. The apparatus of claim 38, wherein the identified communication parameter comprises a transmission power, a modulation order, a coding rate, a modulation and coding scheme (MCS), a number of repetitions for a control channel or a shared channel, or a combination thereof.

40. The apparatus of claim 31, wherein the instructions are further executable by the processor to cause the network device to:
determine the number of repetitions for downlink transmissions, the number of repetitions being different than a previous number of repetitions for the downlink transmissions; and
receive the second message including the channel quality information based at least in part on the number of repetitions being different than the previous number of repetitions.

41. An apparatus for wireless communications of a user equipment (UE), comprising:
means for receiving, from a network device, a first message of a random access procedure;
means for identifying channel quality information for a communication link between the network device and the UE; and
means for transmitting, to the network device and in response to the first message, a second message of the random access procedure, the second message comprising an indication of the identified channel quality information in a multi-bit channel quality field of the second message associated with a single protocol layer of a control plane protocol stack based at least in part on a capability of the network device to support the second message comprising the indication of the identified channel quality information and based at least in part on a determination to change a number of repetitions for downlink transmissions.

42. An apparatus for wireless communications of a network device, comprising:
means for transmitting a first message of a random access procedure; and
means for receiving, in response to the first message, a second message of the random access procedure, the second message comprising an indication of channel quality information for a communication link between the network device and a user equipment (UE), the indication in a multi-bit channel quality field of the second message associated with a single protocol layer of a control plane protocol stack based at least in part on a capability of the network device to support the second message comprising the indication of the channel quality information and based at least in part on a determination to change a number of repetitions for downlink transmissions.

43. A non-transitory computer-readable medium storing code for wireless communications of a user equipment (UE), the code comprising instructions executable by a processor to:
receive, from a network device, a first message of a random access procedure;
identify channel quality information for a communication link between the network device and the UE; and
transmit, to the base network device and in response to the first message, a second message of the random access procedure, the second message comprising an indication of the identified channel quality information in a multi-bit channel quality field of the second message associated with a single protocol layer of a control plane protocol stack based at least in part on a capability of the network device to support the second message comprising the indication of the identified channel quality information and based at least in part on a determination to change a number of repetitions for downlink transmissions.

44. A non-transitory computer-readable medium storing code for wireless communications of a network device, the code comprising instructions executable by a processor to:
transmit a first message of a random access procedure; and
receive, in response to the first message, a second message of the random access procedure, the second message comprising an indication of channel quality information for a communication link between the network device and a user equipment (UE), the indication in a multi-bit channel quality field of the second message associated with a single protocol layer of a control plane protocol stack based at least in part on a capability of the network device to support the second message comprising the indication of the channel quality information and based at least in part on a determination to change a number of repetitions for downlink transmissions.

* * * * *